US012697831B2

(12) United States Patent
Walker et al.

(10) Patent No.: US 12,697,831 B2

(45) Date of Patent: Aug. 4, 2026

(54) COMPOSITION

(71) Applicant: DataLase Ltd., Widnes (GB)

(72) Inventors: Martin Walker, Widnes (GB); Richard Cook, Widnes (GB)

(73) Assignee: DataLase Ltd., Widnes (GB)

( * ) Notice: Subject to any disclaimer, the term of this patent is extended or adjusted under 35 U.S.C. 154(b) by 213 days.

(21) Appl. No.: 18/252,230

(22) PCT Filed: Nov. 10, 2021

(86) PCT No.: PCT/EP2021/081293

§ 371 (c)(1),
(2) Date: May 9, 2023

(87) PCT Pub. No.: WO2022/101297

PCT Pub. Date: May 19, 2022

(65) Prior Publication Data

US 2024/0010020 A1 Jan. 11, 2024

(30) Foreign Application Priority Data

Nov. 10, 2020 (EP) .................................... 20206826

(51) Int. Cl.

| | |
|---|---|
| *B41M 5/333* | (2006.01) |
| *C09D 11/033* | (2014.01) |
| *C09D 11/037* | (2014.01) |
| *C09D 11/50* | (2014.01) |
| *B41M 5/327* | (2006.01) |

(52) U.S. Cl.
CPC ......... *B41M 5/3335* (2013.01); *C09D 11/033* (2013.01); *C09D 11/037* (2013.01); *C09D 11/50* (2013.01); *B41M 5/3275* (2013.01); *B41M 2205/04* (2013.01); *B41M 2205/12* (2013.01)

(58) Field of Classification Search
CPC .............. B41M 5/3275; B41M 5/3335; B41M 2205/04; B41M 2205/12; C09D 11/033; C09D 11/037; C09D 11/50
See application file for complete search history.

(56) References Cited

U.S. PATENT DOCUMENTS

| | | |
|---|---|---|
| 5,370,988 A | 12/1994 | Manganiello et al. |
| 5,439,790 A | 8/1995 | Muthyala et al. |
| 6,925,051 B2 | 8/2005 | Wisnudel et al. |
| 7,163,987 B2 | 1/2007 | Weber et al. |
| 7,485,403 B2 | 2/2009 | Khan |
| 10,005,304 B2 | 6/2018 | Clayton et al. |
| 2005/0049931 A1 | 3/2005 | Wisnudel et al. |
| 2005/0050571 A1 | 3/2005 | Wisnudel et al. |
| 2010/0059691 A1 | 3/2010 | Lewis et al. |
| 2011/0248225 A1 | 10/2011 | Mamak et al. |
| 2014/0028011 A1 | 1/2014 | Yamauchi et al. |
| 2014/0057783 A1 | 2/2014 | Stork et al. |
| 2018/0056690 A1 | 3/2018 | Bollstrom et al. |
| 2018/0141364 A1 | 5/2018 | Steenackers et al. |

FOREIGN PATENT DOCUMENTS

| | | |
|---|---|---|
| CA | 2855287 | 4/2013 |
| CN | 11448181 A | 3/1997 |
| FR | 3065728 | 11/2018 |
| JP | H07314904 | 12/1995 |
| JP | H0958134 | 3/1997 |
| JP | H0958135 | 3/1997 |
| JP | 2003305956 A | 10/2003 |
| JP | 2004223884 | 8/2004 |
| JP | 2019010822 | 1/2019 |
| JP | 2019142090 | 8/2019 |
| JP | 2020151930 A | 9/2020 |
| JP | 2021-155646 A | 10/2021 |
| WO | 2005/068207 | 7/2005 |
| WO | 2006/108745 | 10/2006 |
| WO | 2009/093028 | 7/2009 |
| WO | 2010/001171 | 1/2010 |
| WO | 2010/029329 | 3/2010 |
| WO | 2012/114121 | 8/2012 |
| WO | 2013/068729 | 5/2013 |
| WO | 2013/098076 | 7/2013 |
| WO | 2015/015200 | 2/2015 |
| WO | 2016/0997667 | 6/2016 |
| WO | 2016/184881 | 11/2016 |
| WO | 2017/157888 | 9/2017 |
| WO | 2020/105564 | 5/2020 |

OTHER PUBLICATIONS

Machine translation of detailed description of JP 2020-151930 acquired on Aug. 21, 2025.*
International Search Report and Written Opinion, International Application No. PCT/EP221/081293, Jan. 24, 2022, 12 pages.
International Search Report and Written Opinion, International Application No. PCT/GB2020/053186, PCT/ISA/210 and PCT/ISA/237, mail date Mar. 25, 2021, 9 pages.
International Search Report and Written Opinion, International Application No. PCT/EP2021/061253, mail date Jul. 12, 2021, 9 pages.

* cited by examiner

*Primary Examiner* — Gerard Higgins

(74) *Attorney, Agent, or Firm* — SALIWANCHIK, LLOYD & EISENSCHENK

(57) ABSTRACT

In the present invention, there is provided a use of 1,1,1-tris(4-hydroxyphenyl)ethane in a composition in the formation of an image on a substrate having said composition applied thereon, wherein the image is formed upon exposure of the composition to NIR or IR radiation, and wherein the image is capable of being retained on the substrate for at least 1 day under conditions of at least 50% relative humidity. The present invention is further directed towards compositions comprising 1,1,1-tris(4-hydroxyphenly)ethane, in addition to substrates, methods of forming an image and printing processes comprising said compositions.

3 Claims, No Drawings

1

COMPOSITION

CROSS-REFERENCE TO RELATED APPLICATIONS

This application is a national stage application of International Patent Application No. PCT/EP2021/081293, filed Nov. 10, 2021, which claims priority to European Application No. 20206826.8, filed Nov. 10, 2020, the disclosures of each of which are incorporated herein by reference in their entirety, including any FIGURES, tables, and drawings.

FIELD OF THE INVENTION

The present invention relates to the preparation and use of radiation-reactive compositions.

BACKGROUND OF THE INVENTION

The use of radiation-reactive compositions for variable information printing to produce human and/or machine-readable elements is known. Following application of a radiation-reactive composition to a substrate, an image(s) can be formed upon exposure of the composition to appropriate radiation.

Leuco dyes are known colour-forming compounds that are utilised in combination with colour developers in radiation-reactive compositions to generate variable information on substrates. Upon application of radiation to a composition on a substrate, the leuco dye and colour developer interact to form colour and thus, an image(s). WO 2015/015200 and WO 2013/068729 both disclose such radiation-reactive compositions.

However, problems with currently known radiation-reactive compositions comprising colour-forming leuco dyes and colour developers exist, in that the images formed can fade over time when exposed to high-humidity conditions. This is particularly the case when the substrates upon which the compositions have been applied are semi-porous or porous, such as paper-based substrates.

Furthermore, when variable information is desired on corrugated semi-porous or porous substrates such as corrugated paper-based substrates, currently known radiation-reactive compositions comprising leuco dyes and colour developers can typically only be applied to such substrates after production of the corrugated paper-based substrates using industrial application processes such as flexographic post-printing. Due to the conditions under which the corrugated paper-based substrates are produced, such as high temperatures, the leuco dye and colour developer of currently known compositions would interact and prematurely form colour if said compositions were already applied to the paper-based substrates prior to formation of the printed corrugated paper-based substrate. Any subsequent generation of variable information on these substrates therefore becomes impossible. Accordingly, use of currently known radiation-reactive compositions in the production of printed corrugated semi-porous or porous substrates, such as printed corrugated paper-based substrates is limited to taking place after production of the corrugated paper-based substrates themselves, using industrial application processes such as flexographic post-printing.

In addition, during the production of many substrates suitable for use in the packaging industry, the substrates or intermediates thereof are exposed to high temperature conditions during manufacturing, conversion, processing, and formation. Such substrates can also be subjected to high temperature and/or high humidity conditions during production for antibacterial, anti-germicidal, antimicrobial and antiviral purposes. Due to the high temperature and/or high humidity, if currently known radiation-reactive compositions comprising leuco dyes and colour developers are applied to the substrates prior to exposure to such conditions, the leuco dye and colour developer would interact and prematurely form colour, such that subsequent variable information generation becomes impossible.

Still further, when currently known radiation-reactive compositions comprising colour-forming leuco dyes and colour developers comprise a solvent, i.e. are solvent-based compositions, problems exist in that the leuco dye and colour developer interact and prematurely form colour upon standard formulation of the composition (during stirring, mixing, blending, processing and storage thereof) prior to application to a substrate. Such solvent-based compositions cannot therefore be utilised for industrial processes such as printing in the formation of variable information on substrates.

It is therefore desirable to provide a solution to the above problems that enables not only effective formation and retention of variable information on a substrate under high-humidity conditions, but also enables the use of solvent-based radiation-reactive compositions in the printing and formation of variable information on substrates, as well as additional printing processes involving high temperature and/or high humidity conditions for the manufacture of printed corrugated porous or semi-porous substrates such as paper-based substrates.

SUMMARY OF THE INVENTION

According to a first aspect of the present invention, there is provided a use of 1,1,1-tris(4-hydroxyphenyl)ethane in a composition in the formation of an image on a substrate having said composition applied thereon, wherein the image is formed upon exposure of the composition to NIR or IR radiation, and wherein the image is capable of being retained on the substrate for at least 1 day under conditions of at least 50% relative humidity.

According to a second aspect of the present invention, there is provided a use of 1,1,1-tris(4-hydroxyphenyl)ethane in a composition in the formation of an image on a substrate having said composition applied thereon, wherein the image is formed upon exposure of the composition to NIR or IR radiation, and wherein the image is capable of being retained on the substrate for at least 1 day under conditions of from 0.1 to 100 g/kg specific humidity.

According to a third aspect of the present invention, there is provided a use of 1,1,1-tris(4-hydroxyphenyl)ethane as a colour developer in a composition in the formation of an image on a substrate having said composition applied thereon, wherein the image is formed upon exposure of the composition to NIR or IR radiation, and wherein the image is capable of being retained on the substrate for at least 1 day under conditions of at least 50% relative humidity.

According to a fourth aspect of the present invention, there is provided a use of 1,1,1-tris(4-hydroxyphenyl)ethane as a colour developer in a composition in the formation of an image on a substrate having said composition applied thereon, wherein the image is formed upon exposure of the composition to NIR or IR radiation, and wherein the image is capable of being retained on the substrate for at least 1 day under conditions of from 0.1 to 100 g/kg specific humidity.

According to a fifth aspect of the present invention, there is provided a composition comprising a leuco dye, 1,1,1-tris(4-hydroxyphenyl)ethane and an organic non-polar solvent.

According to a sixth aspect of the present invention, there is provided a composition comprising a leuco dye, 1,1,1-tris(4-hydroxyphenyl)ethane and an organic non-polar solvent, said composition being capable of forming an image on a substrate upon exposure of the composition to radiation when applied on the substrate and retaining said image for at least 1 day under conditions of at least 50% relative humidity.

According to a seventh aspect of the present invention, there is provided a composition comprising a leuco dye, 1,1,1-tris(4-hydroxyphenyl)ethane and an organic non-polar solvent, said composition being capable of forming an image on a substrate upon exposure of the composition to radiation when applied on the substrate and retaining said image for at least 1 day under conditions of from 0.1 to 100 g/kg specific humidity.

According to an eighth aspect of the present invention, there is provided a composition comprising a leuco dye, and 1,1,1-tris(4-hydroxyphenyl)ethane and water.

According to a ninth aspect of the present invention, there is provided a composition comprising a leuco dye, and 1,1,1-tris(4-hydroxyphenyl)ethane and water, said composition being capable of forming an image on a substrate upon exposure of the composition to NIR or IR radiation when applied on the substrate and retaining said image for at least 1 day under conditions of at least 50% relative humidity.

According to a tenth aspect of the present invention, there is provided a composition comprising a leuco dye, and 1,1,1-tris(4-hydroxyphenyl)ethane and water, said composition being capable of forming an image on a substrate upon exposure of the composition to NIR or IR radiation when applied on the substrate and retaining said image for at least 1 day under conditions of from 0.1 to 100 g/kg specific humidity.

According to an eleventh aspect of the present invention, there is provided a method of forming a composition comprising a leuco dye, 1,1,1-tri(4-hydroxyphenyl)ethane and water, the method comprising combining a first formulation containing the leuco dye as solid particles dispersed therein and a second formulation containing 1,1,1-tris(4-hydroxyphenyl)ethane as solid particles dispersed therein.

According to a twelfth aspect of the present invention, there is provided a method of forming a composition comprising a leuco dye, 1,1,1-tris(4-hydroxyphenyl)ethane and an organic non-polar solvent, the method comprising combining a first formulation containing the leuco dye as solid particles dispersed therein and a second formulation containing 1,1,1-tris(4-hydroxyphenyl)ethane as solid particles dispersed therein.

According to a thirteenth aspect of the present invention, there is provided a substrate comprising a composition applied thereto, the composition comprising a leuco dye and 1,1,1-tris(4-hydroxyphenyl)ethane.

According to a fourteenth aspect of the present invention, there is provided a substrate comprising a composition applied thereto, the composition comprising a leuco dye and 1,1,1-tris(4-hydroxyphenyl)ethane, said composition being capable of forming an image on the substrate upon exposure of the composition to NIR or IR radiation and retaining said image for at least 1 day under conditions of at least 50% relative humidity.

According to a fifteenth aspect of the present invention, there is provided a substrate comprising a composition applied thereto, the composition comprising a leuco dye and 1,1,1-tris(4-hydroxyphenyl)ethane, said composition being capable of forming an image on the substrate upon exposure of the composition to NIR or IR radiation and retaining said image for at least 1 day under conditions of from 0.1 to 100 g/kg specific humidity.

According to a sixteenth aspect of the present invention, there is provided a substrate comprising a composition applied thereto, the composition comprising a leuco dye, 1,1,1-tris(4-hydroxyphenyl)ethane and an organic non-polar solvent.

According to a seventeenth aspect of the present invention, there is provided a substrate comprising a composition applied thereto, the composition comprising a leuco dye, 1,1,1-tris(4-hydroxyphenyl)ethane and an organic non-polar solvent, said composition being capable of forming an image on the substrate upon exposure of the composition to radiation and retaining said image for at least 1 day under conditions of at least 50% relative humidity.

According to a eighteenth aspect of the present invention, there is provided a substrate comprising a composition applied thereto, the composition comprising a leuco dye, 1,1,1-tris(4-hydroxyphenyl)ethane and an organic non-polar solvent, said composition being capable of forming an image on the substrate upon exposure of the composition to radiation and retaining said image for at least 1 day under conditions of from 0.1 to 100 g/kg specific humidity.

According to a nineteenth aspect of the present invention, there is provided a paper-based substrate comprising a composition applied thereto, said composition comprising a leuco dye and 1,1,1-tris(4-hydroxyphenyl)ethane.

According to a twentieth aspect of the present invention, there is provided a paper-based substrate comprising a composition applied thereto, said composition comprising a leuco dye and 1,1,1-tris(4-hydroxyphenyl)ethane, and being capable of forming an image on the paper-based substrate upon exposure of the composition to NIR or IR radiation and retaining said image for at least 1 day under conditions of at least 50% relative humidity.

According to a twenty-first aspect of the present invention, there is provided a paper-based substrate comprising a composition applied thereto, said composition comprising a leuco dye and 1,1,1-tris(4-hydroxyphenyl)ethane, and being capable of forming an image on the paper-based substrate upon exposure of the composition to NIR or IR radiation and retaining said image on the for at least 1 day under conditions of from 0.1 to 100 g/kg specific humidity.

According to a twenty-second aspect of the present invention, there is provided a method of forming a substrate having a composition applied thereon, the method comprising applying a composition comprising a leuco dye, 1,1,1-tris(4-hydroxyphenyl)ethane and an organic non-polar solvent, to the substrate.

According to a twenty-third aspect of the present invention, there is provided method of forming a paper-based substrate having a composition applied thereon, the method comprising applying a composition comprising a leuco dye and 1,1,1-tris(4-hydroxyphenyl)ethane to the paper-based substrate.

According to a twenty-fourth aspect of the present invention, there is provided a process for manufacturing packaging from a printed substrate comprising applying a composition to a substrate to form a printed substrate, wherein the composition comprises a leuco dye and 1,1,1-tris(4-hydroxyphenyl)ethane, and subsequently forming the printed substrate into packaging during which the printed substrate is exposed to temperatures of from 80 to 200° C. and/or conditions of at least 50% relative humidity.

According to a twenty-fifth aspect of the present invention, there is provided a process for manufacturing packaging from a printed substrate comprising applying a composition to a substrate to form a printed substrate, wherein the composition comprises a leuco dye and 1,1,1-tris(4-hydroxyphenyl)ethane, and subsequently forming the printed substrate into packaging during which the printed substrate is exposed to temperatures of from 80 to 200° C. and/or conditions of from 0.1 to 100 g/kg specific humidity.

According to a twenty-sixth aspect of the present invention, there is provided a process comprising applying a composition to a substrate to form a printed substrate, wherein the composition comprises a leuco dye and 1,1,1-tris(4-hydroxyphenyl)ethane and subsequently exposing the printed substrate to temperatures of from 80 to 200° C. and/or conditions of at least 50% relative humidity.

According to a twenty-seventh aspect of the present invention, there is provided a process comprising applying a composition to a substrate to form a printed substrate, wherein the composition comprises a leuco dye and 1,1,1-tris(4-hydroxyphenyl)ethane and subsequently exposing the printed substrate to temperature of from 80 to 200° C. and/or conditions of from 0.1 to 100 g/kg specific humidity.

According to a twenty-eighth aspect of the present invention, there is provided a process comprising applying a composition to a substrate to form a printed substrate, wherein the composition comprises a leuco dye and 1,1,1-tris(4-hydroxyphenyl)ethane and subsequently exposing the composition to radiation to form an imaged printed substrate and then exposing the imaged printed substrate to temperatures of from 80 to 200° C. and/or conditions of at least 50% relative humidity.

According to a twenty-ninth aspect of the present invention, there is provided a process comprising applying a composition to a substrate to form a printed substrate, wherein the composition comprises a leuco dye and 1,1,1-tris(4-hydroxyphenyl)ethane and subsequently exposing the composition to radiation to form an imaged printed substrate and then exposing the imaged printed substrate to temperature of from 80 to 200° C. and/or conditions of from 0.1 to 100 g/kg specific humidity.

According to a thirtieth aspect of the present invention, there is provided a process for manufacturing a printed corrugated paper-based substrate comprising: applying a composition to a paper-based substrate to form a printed paper-based substrate, wherein the composition comprises a leuco dye and 1,1,1-tris(4-hydroxyphenyl)ethane, and subsequently forming the printed paper-based substrate into a printed corrugated paper-based substrate.

According to a thirty-first aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate.

According to a thirty-second aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate, the image capable of being retained on the substrate for at least 1 day under conditions of at least 50% relative humidity.

According to a thirty-third aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate, the image capable of being retained on the substrate for at least 1 day under conditions of from 0.1 to 100 g/kg specific humidity.

According to a thirty-fourth aspect of the present invention, there is provided a method of forming an image on a substrate having a composition applied thereto, the composition comprising a leuco dye, 1,1,1-tris(4-hydroxyphenyl)ethane and an organic non-polar solvent, and wherein the method comprises exposing the composition to radiation to form an image on the substrate.

According to a thirty-fifth aspect of the present invention, there is provided a method of forming an image on a substrate having a composition applied thereto, the composition comprising a leuco dye, 1,1,1-tris(4-hydroxyphenyl)ethane and an organic non-polar solvent, and wherein the method comprises exposing the composition to radiation to form an image on the substrate, the image capable of being retained on the substrate for at least 1 day under conditions of at least 50% relative humidity.

According to a thirty-sixth aspect of the present invention, there is provided a method of forming an image on a substrate having a composition applied thereto, the composition comprising a leuco dye, 1,1,1-tris(4-hydroxyphenyl)ethane and an organic non-polar solvent, and wherein the method comprises exposing the composition to radiation to form an image on the substrate, the image capable of being retained on the substrate for at least 1 day under conditions of from 0.1 to 100 g/kg specific humidity.

According to a thirty-seventh aspect of the present invention, there is provided a use of a composition comprising a leuco dye, 1,1,1-tris(4-hydroxyphenyl)ethane and an organic non-polar solvent, in the formation of an image on a substrate having the composition applied thereto upon exposure of the composition to radiation.

According to a thirty-eighth aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation.

According to a thirty-ninth aspect of the present invention, there is provided a use of a composition comprising a leuco dye, 1,1,1-tris(4-hydroxyphenyl)ethane and an organic non-polar solvent, in the formation of an image on a substrate having the composition applied thereto upon exposure of the composition to radiation, said composition being capable of retaining said image for at least 1 day under conditions of at least 50% relative humidity.

According to a fortieth aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation, said composition being capable of retaining said image for at least 1 day under conditions of at least 50% relative humidity.

According to a forty-first aspect of the present invention, there is provided a use of a composition comprising a leuco dye, 1,1,1-tris(4-hydroxyphenyl)ethane and an organic non-polar solvent, in the formation of an image on a substrate having the compositions applied thereto upon exposure of the composition to radiation, said composition being capable of retaining said image for at least 1 day under conditions of from 0.1 to 100 g/kg specific humidity.

According to a forty-second aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation, said composition being capable of retaining said image for at least 1 day under conditions of from 0.1 to 100 g/kg specific humidity.

DETAILED DESCRIPTION OF THE INVENTION

It has been surprisingly and advantageously found that 1,1,1-tris(4-hydroxyphenyl)ethane enables the formation of compositions that demonstrate beneficial image formation and retention over time under high-humidity conditions, specifically under conditions of at least 50% relative humidity or under conditions of from 0.1 to 100 g/kg specific humidity. The images formed through exposure of said compositions to radiation do not fade, even when exposed to such high-humidity conditions, i.e. conditions of at least 50% relative humidity or conditions of from 0.1 to 100 g/kg specific humidity, over time—for example, during storage or transport of substrates having the compositions applied thereto in high-humidity conditions. Without being bound by theory, the present inventors consider that the chemical structure of 1,1,1-tris(4-hydroxyphenyl)ethane, in particular, the relatively high overall number and ratio of potentially reactive phenolic groups present in the molecule in comparison to the relatively low molecular weight, as well as the resulting proton availability are key to providing the advantageous properties detailed above.

The presence of 1,1,1-tris(4-hydroxyphenyl)ethane also advantageously enables the composition to be applied to, and an image(s) formed using radiation on, porous or semi-porous substrates such as paper-based substrates. This was previously difficult to achieve successfully given the porous or semi-porous nature of the substrates. Without being bound by theory, the present inventors consider that dissolution, mobility, migration, neutralisation and/or reversion of the components of previously utilised compositions caused the image(s) formed on such porous or semi-porous substrates to fade over time. The use of 1,1,1-tris(4-hydroxyphenyl)ethane thus enables the formation and retention of an image(s) on these porous or semi-porous substrates, such as paper-based substrates.

Further, the presence of 1,1,1-tris(4-hydroxyphenyl)ethane enables the formation and use of compositions comprising selected organic solvents in the formation of an image(s) on a substrate. This was previously difficult to achieve successfully given the interaction between the colour-forming compound, colour developer and solvent upon formulation of known colour-forming compositions, such that colour is prematurely generated prior to application of the composition to a substrate. Such a composition cannot then be utilised to form an image on a substrate. The use of 1,1,1-tris(4-hydroxyphenyl)ethane thus enables the formation of a colourless composition comprising an organic solvent by standard formulation (including stirring, mixing, blending, processing and storage thereof). Such a colourless composition can then be applied to a substrate, upon which variable information in the form of an image(s) can be subsequently formed and retained—or example during storage or transport in high-humidity conditions.

In addition, it has further been surprisingly and advantageously found that the use of 1,1,1-tris(4-hydroxyphenyl) ethane enables the formation of compositions that are suitable for use in previously unfeasible printing processes. As described in more detail below, in the formation of printed corrugated porous or semi-porous substrates, such as printed corrugated paper-based substrates, the compositions of the present invention can be applied to paper-based substrates using pre-printing industrial processes prior to their manufacture into printed corrugated paper-based substrates. The leuco dye and 1,1,1-tris(4-hydroxyphenyl)ethane of the composition are not detrimentally or negatively affected by the conditions under which the production of the printed corrugated paper-based substrates takes place and do not interact to form colour. Typically, such conditions include high temperature processes and environments, such that the compositions of the present invention are thus shown to demonstrate advantageous and beneficial heat resistance. The resulting printed corrugated paper-based substrates can be utilised in variable information production and the formation of an image(s) on a substrate. Previously, such a process was difficult to achieve using colour-forming leuco dyes as the leuco dye and colour developer of a composition would interact under the high-temperature conditions required for the formation of the printed corrugated paper-based substrates. Accordingly, if printed corrugated paper-based substrates were desired using industrial application processes such as flexographic printing, the application of compositions to paper or card substrates could only take place after the production of the corrugated paper-based substrates (post-printing), and not before (pre-printing). For the composition of the present invention, both pre-printing and post-printing processes can be used. The use of 1,1,1-tris(4-hydroxyphenyl)ethane therefore also facilitates the development of a new additional printing process for corrugated paper-based substrates.

Furthermore, it has been surprisingly and advantageously found that the presence of 1,1,1-tris(4-hydroxyphenyl)ethane in the compositions of the present invention enables them to be applied to many substrates suitable for use in the packaging industry prior to exposure of the substrates to high temperature and/or high humidity conditions during manufacture, conversion or processing into packaging, or other antibacterial, antimicrobial or antiviral process to which the substrates may be exposed. The compositions of the present invention do not prematurely colour under such high temperature and/or high-humidity conditions, and subsequent variable information formation through the production of an images(s) on the resulting packaging or substrate is achievable. Such pre-printing of the substrates prior to exposure to high temperature and/or high-humidity conditions would not have been previously possible as the leuco dye and colour developers of previously known radiation-reactive compositions would interact under these conditions such that formation of variable information on the resulting packaging or substrates was not possible.

According to a first aspect of the present invention, there is provided a use of 1,1,1-tris(4-hydroxyphenyl)ethane in a composition in the formation of an image on a substrate having said composition applied thereon, wherein the image is formed upon exposure of the composition to NIR or IR radiation, and wherein the image is capable of being retained on the substrate for at least 1 day under conditions of at least 50% relative humidity.

According to a second aspect of the present invention, there is provided a use of 1,1,1-tris(4-hydroxyphenyl)ethane in a composition in the formation of an image on a substrate having said composition applied thereon, wherein the image is formed upon exposure of the composition to NIR or IR radiation, and wherein the image is capable of being retained on the substrate for at least 1 day under conditions of from 0.1 to 100 g/kg specific humidity.

According to a third aspect of the present invention, there is provided a use of 1,1,1-tris(4-hydroxyphenyl)ethane as a colour developer in a composition in the formation of an image on a substrate having said composition applied thereon, wherein the image is formed upon exposure of the composition to NIR or IR radiation, and wherein the image is capable of being retained on the substrate for at least 1 day under conditions of at least 50% relative humidity.

According to a fourth aspect of the present invention, there is provided a use of 1,1,1-tris(4-hydroxyphenyl)ethane as a colour developer in a composition in the formation of an image on a substrate having said composition applied thereon, wherein the image is formed upon exposure of the composition to NIR or IR radiation, and wherein the image is capable of being retained on the substrate for at least 1 day under conditions of from 0.1 to 100 g/kg specific humidity.

All features of the above first to fourth aspects, and as discussed below as preferred or optional, are applicable to all other aspects described herein. In the same manner, all features of all other aspects described herein, whether preferred or optional, are applicable to the above first to fourth aspects of the present invention.

More commonly known as THPE, 1,1,1-tris(4-hydroxyphenyl)ethane is a thermal acid-generating agent which acts as a colour developer in the composition of the present invention. It is this component that enables the composition to achieve 'humidity-resistance', be 'humidity-resistant' and facilitate the formation of humidity-resistant images.

By 'humidity-resistant', 'humidity-resistance' or like terms as used herein, is meant a composition that is capable of retaining an image on a substrate for at least 1 day under conditions of at least 50% relative humidity or conditions of from 0.1 to 100 g/kg specific humidity, such that the image does not fade. In the context of the present invention, 'humidity-resistant', 'humidity-resistance' and other like terms may also be used to refer to the image itself, i.e. an image that is retained on a substrate for at least 1 day under conditions of at least 50% relative humidity or conditions of from 0.1 to 100 g/kg specific humidity, such that image does not fade. Further, in the context of the present invention, 'humidity-resistant', 'humidity-resistance' and other like terms may also be used to refer to a composition that does not prematurely colour upon exposure to conditions of at least 50% relative humidity or conditions of from 0.1 to 100 g/kg specific humidity. The composition does not prematurely colour following application to the substrate and prior to the intended application of radiation to generate variable information and an image thereon, even when exposed to conditions of at least 50% relative humidity or from 0.1 to 100 g/kg specific humidity whilst on the substrate. The composition does not form colour upon exposure to any conditions other than the intended application of radiation to the composition to facilitate formation of the image. The composition may be exposed to such conditions upon manufacture of packaging using a substrate having a composition applied thereto, i.e. printed thereon, or during other high-humidity processes to which a printed substrate may be exposed such as sterilisation—all such processes being prior to the application of radiation to the composition. Such 'humidity-resistance', i.e. the ability of the composition to not prematurely colour following application to the substrate and prior to the application of radiation when exposed to such conditions can also be demonstrated through measurement of a $\Delta E$ value, which represents any measurable difference in L*a*b* colour of the composition. The difference in L*a*b* colour of a composition applied to a substrate but prior to the application of radiation, and a composition applied to a substrate and exposed to conditions of at least 50% relative humidity or from 0.1 to 100 g/kg specific humidity, but prior to the application of radiation, can be compared to determine a $\Delta E$ value. A low $\Delta E$ measurement, is preferred, indicating that there is little quantitative colour difference between the two samples being compared such that they can be considered qualitatively comparable and visually the same, i.e. no premature colouration has occurred.

The ability of the image to remain 'humidity-resistant', i.e. to not fade over time and be retained on a substrate for at least 1 day under conditions of at least 50% relative humidity or conditions of from 0.1 to 100 g/kg specific humidity, is evaluated through measurement of the optical density of the image. It will be appreciated by a skilled person that, depending on the colour-forming leuco dye present in the composition, the colour of the image formed may vary. By the term "colour" and like terms used herein is meant any of the colours and hues of the visible light colour spectrum, i.e. red, orange, yellow, blue, green and violet, in addition to black, brown, turquoise, purple, pink, cyan, and magenta, and mixtures thereof. Both primary and secondary colours are encompassed, i.e. it will be appreciated by a skilled person that the colour formed by a leuco dye upon exposure of the composition to radiation may be a primary or secondary colour. In the context of the present invention, the term may also be used to describe differing shades of each of the colours of the visible light colour spectrum, in addition to magenta, cyan, pink, purple, turquoise, brown and black.

When the image formed is black in colour or a shade or tint thereof, including greyscale, the ability of the image to remain 'humidity-resistant' is evaluated by measurement of an absolute optical density black (ODB) value. The absolute ODB value measures the optical density of the black colour of the image. When the image formed is red in colour or a shade or tint thereof, the ability of the image to remain 'humidity-resistant' is evaluated by measurement of an absolute optical density magenta (ODM) value. The absolute ODM value measures the optical density of the magenta colour of the image. When the image formed is blue in colour or a shade or tint thereof, the ability of the image to remain 'humidity-resistant' is evaluated by measurement of an absolute optical density cyan (ODC) value. The absolute ODC value measures the optical density of the cyan colour of the image. When the image formed is yellow in colour or a shade or tint thereof, the ability of the image to remain 'humidity-resistant' is evaluated by measurement of an absolute optical density yellow (ODY) value. The absolute ODY value measures the optical density of the yellow colour of the image. In the context of ODB, ODM, ODC and ODY values, the higher the value, the darker the respective black, magenta, cyan or yellow colour formed.

The absolute ODB, ODM, ODC and ODY value quantifies the optical density on the respective black, magenta, cyan or yellow colour scale from low to high values, where ODB, ODM, ODC and ODY measurements can be made using a standard instrument densitometer and X-Rite eXact or SpectroEye or TechKon SpectroDens spectrophotometer.

The difference, $\Delta ODB$, $\Delta ODM$, $\Delta ODC$ or $\Delta ODY$ in measured optical density between the image (absolute ODB, ODM, ODC or ODY value) and the un-imaged composition background, i.e. the part(s) of the composition on the substrate that have not been exposed to radiation (background ODB, ODM, ODC or ODY) can also be measured.

In the context of the present invention, effective formation and retention of an image under conditions of at least 50% relative humidity or conditions of from 0.1 to 100 g/kg specific humidity is demonstrated by consistent measurement of an absolute ODB, ODM, ODC or ODY value of 1.0 or more, such as 1.1 or more, or even 1.2 or more, such as 1.3 or more, or 1.4 or more. An absolute ODB, ODM, ODC or ODY value that does not decrease below 1.0, such as below 1.1, or below 1.2, such as below 1.3, or even below 1.4 over time demonstrates formation of a humidity-resistant image under such conditions.

Typically, in the context of the present invention, the colour formed by the leuco dye, and thus the colour of the image is black and its 'humidity-resistance' is evaluated by measurement of an absolute ODB value.

It will be appreciated by a skilled person that it is desired that the image formed using the composition of the present invention be retained on the substrate upon exposure to the relative humidity and specific humidity conditions stated herein for as long as the substrate is required for use, including transportation and storage thereof, such as during use in the supply chain of the packaging industry. Preferably, the image is capable of being retained on the substrate under the relative humidity and specific humidity conditions stated herein for at least 1 day, such as for at least 2 days, such as for at least 4 days, such as for at least 1 week, such as for at least 2 weeks, or even for at least 4 weeks, more preferably for at least 5 weeks, and more preferably for at least 6 weeks, including at least 2 months and at least 5 months, such as at least 6 months, or even at least 12 months. By this is meant that an absolute ODB, ODM, ODC or ODY value of 1.0 or more, such as 1.1 or more, or even 1.2 or more, such as 1.3 or more, or 1.4 or more, is retained for at least 1 day, such as for at least 2 days, such as for at least 4 days, such as for at least 1 week, such as for at least 2 weeks, or even for at least 4 weeks, more preferably for at least 5 weeks, and more preferably for at least 6 weeks, including at least 2 months and at least 5 months, such as at least 6 months, or even at least 12 months under the relative humidity and specific humidity conditions stated herein.

Preferably, the image is retained on the substrate under the relative humidity and specific humidity conditions stated herein for at least 1 day, such as for at least 2 days, such as for at least 4 days, such as for at least 1 week, such as for at least 2 weeks, or even for at least 4 weeks, more preferably for at least 5 weeks, and more preferably for at least 6 weeks, including at least 2 months and at least 5 months, such as at least 6 months, or even at least 12 months.

Preferably, the image is capable of being retained on substrate under conditions of at least 50% relative humidity, such as at least 60% relative humidity, or at least 70% relative humidity, such as at least 80% relative humidity, or even at least 90% relative humidity. The upper limit for these relative humidity values is 100% relative humidity. Preferably, the image is capable of being retained on the substrate under conditions of from 50 to 100% relative humidity, such as from 50 to 90% relative humidity, including from 50 to 70% relative humidity such as from 50 to 60% relative humidity and from 70 to 100% relative humidity such as from 70 to 90% relative humidity.

Preferably, the image is retained on the substrate under conditions of at least 50% relative humidity, such as at least 60% relative humidity, or at least 70% relative humidity, such as at least 80% relative humidity, or even at least 90% relative humidity. The upper limit for these relative humidity values is 100% relative humidity. Preferably, the image is retained on the substrate under conditions of from 50 to 100% relative humidity, such as from 50 to 90% relative humidity, including from 50 to 70% relative humidity such as from 50 to 60% relative humidity and from 70 to 100% relative humidity such as from 70 to 90% relative humidity.

The relative humidity values disclosed herein may be measured at any suitable temperature. Preferably, the relative humidity values disclosed herein are measured at a temperature of from 1 to 55° C., such as from 5 to 45° C., or from 10 to 40° C., or even from 15 to 35° C.

The relative humidity values disclosed herein may be measured at any suitable pressure. Preferably, the relative humidity values disclosed herein are measured at a pressure of from 500 to 1050 hPa, such as from 900 to 1050, or from 900 to 1025 hPa, or from 1000 to 1020 hPa.

Preferably, the image is capable of being retained on the substrate under conditions of from 50 to 100% relative humidity, at a temperature of from 1 to 55° C., and a pressure of from 500 to 1050 hPa. It will be appreciated that for each of relative humidity, temperature and pressure, further preferred values are as detailed above. Any combination of the individual preferred relative humidity, temperature and pressure values is encompassed.

Preferably, the image is retained on the substrate under conditions of from 50 to 100% relative humidity, at a temperature of from 1 to 55° C., and a pressure of from 500 to 1050 hPa. It will be appreciated that for each of relative humidity, temperature and pressure, further preferred values are as detailed above. Any combination of the individual preferred relative humidity, temperature and pressure values is encompassed.

The relative humidity may be measured or determined in any suitable way. Such measurement methods will be well known to a skilled person. Typically, the relative humidity may be measured using a modern digital and/or electronic hygrometer such as capacitive, resistive, thermal, gravimetric and optical types, or a classical hygrometer such as a metal-paper coil, hair tension, psychrometer (wet-and-bulb-thermometer), sling psychrometer, and chilled mirror dew hygrometer types. Alternatively, relative humidity may be controlled, and thus determined through the use of saturated salt aqueous solutions. A saturated salt aqueous solution may be enclosed in a sealed chamber, typically a metal or glass chamber, and heated to a specific temperature. The pressure within the sealed chamber is controlled. The saturated salt aqueous solution generates a specific water vapour pressure above the solution in the enclosed environment when held at the specific temperature. Both the temperature to which the saturated salt solution is heated and the pressure within the sealed chamber, as well as the specific salt utilised in distilled water, are used to determine the relative humidity within the chamber using standard literature calculated conversion values for equilibrium relative humidity levels. For the present invention, relative humidity is controlled and thus determined using saturated salt aqueous solutions. For completeness, 'relative humidity' as described herein refers to how near the air is to its maximum capacity for holding water vapour, so this is the amount of water vapour present in air relative to the maximum at a given temperature (expressed as a percentage) and also the ratio of the partial pressure of water vapour to the equilibrium vapour pressure of water at a given temperature (expressed as a percentage). Relative humidity compares the actual amount of water vapour in the air with the maximum amount of water vapour that can be present in air at a given temperature and pressure as a percentage such that completely saturated air has a relative humidity of 100% and air that contains no water vapour has a relative humidity of 0%.

Alternatively, the image is preferably capable of being retained on the substrate under conditions of from 0.1 to 100 g/kg specific humidity, such as from 1 to 80 g/kg, or from 2 to 75 g/kg, or from 4 to 60 g/kg, or even from 8 to 50 g/kg.

Preferably, the image is retained on the substrate under conditions of from 0.1 to 100 g/kg specific humidity, such as from 1 to 80 g/kg, or from 2 to 75 g/kg, or from 4 to 60 g/kg, or even from 8 to 50 g/kg.

For completeness, 'specific humidity' as described herein refers to the mass of water vapour in a unit mass of moist air, i.e. grams of water vapour per kilogram of air.

The specific humidity may be measured or determined in any suitable way. Such measurement methods will be well known to a skilled person. Specific humidity is typically measured or determined by calculation from measured relative humidity values.

Generally, humidity is the quantity of water vapour present in the air, and can be expressed as an absolute, specific or relative value, there being a relationship between these values. For the present invention, the relationship between relative humidity and specific humidity as detailed in Equation 1 below can be used to determine specific humidity:

$$\text{specific humidity(g/kg)} = \text{maximum capacity(g/kg)} \times \frac{\text{relative humidity (\%)}}{100(\%)} \quad (1)$$

Maximum capacity (g/kg) is the grams of water vapour per kilogram of air at a given temperature and pressure. Maximum capacity values can be obtained from standard literature calculated values at a given temperature and pressure, such as those shown in Table A below at an atmospheric sea level atmospheric pressure of 1013.25 hPa.

TABLE A

| Temperature (° C.) | Maximum Capacity (g/Kg) grams of water vapour per kilogram of air |
| --- | --- |
| −40 | 0.1 |
| −35 | 0.2 |
| −30 | 0.3 |
| −25 | 0.51 |
| −20 | 0.75 |
| −10 | 1.8 |
| 0 | 3.8 |
| +5 | 5 |
| +10 | 7.8 |
| +15 | 10 |
| +20 | 15 |
| +25 | 20 |
| +30 | 27.7 |
| +35 | 35 |
| +40 | 49.8 |

For the present invention, measurements of relative humidity are determined at a given temperature and pressure within a closed system using saturated salt aqueous solutions as described above and converted to specific humidity using Equation (1).

It will be appreciated by a skilled person that in its role as a colour developer 1,1,1-tris(4-hydroxyphenyl)ethane (a thermal acid-generating agent) interacts with the colour-forming compound of the composition of the present invention upon application of radiation to the composition on the substrate to achieve colour formation and thus, the formation of a discernible humidity-resistant image(s) on the substrate. In the context of the present invention, the colour-forming compound is a leuco dye.

The composition may further comprise a leuco dye as the colour-forming compound. Leuco dyes are well known to a skilled person as compounds capable of forming colour. Examples of suitable leuco dyes are contained in WO 2015/015200 and WO 2013/068729, the content of each being incorporated herein by reference. Examples of suitable leuco dyes include, but are not limited to: spiroxazines, naphthopyrans, phthalides, fluorans, triarylmethanes, benzoxazines, quinazolines, spiropyrans, quinones, tetrazolium salts, thiazines, phenazines and oxazines, some of which are disclosed in WO 2006/108745, the content of which is incorporated herein by reference.

Suitable suppliers of leuco dyes include, but are not limited to: Yamada Chemical Company Limited, Chameleon Speciality Chemicals Limited, and Connect Chemicals.

As described in more detail below, the composition of the present invention may be a water-based or organic non-polar solvent-based composition. When the humidity-resistant composition is a water-based composition, the leuco dye may be selected from: 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro[2-benzofuran-3,9'-xanthene]-1-one (CAS No. 29512-49-0), 2-Anilino-6'-[ethyl(p-toyl)amino]-3'-methylspiro[isobenzofuran-1 (3H),9'-[9H]xanthene]-3-one (CAS No. 59129-79-2), Blue3-CVL 6-(dimethylamino)-3, 3-bis-[4-(dimethylamino) phenyl) phthalide (CAS No 1522-42-7), Blue-4 4,4'-[(9-butyl-9H-carbazol-3-yl)methylene] bis[N-methyl-N-phenylaniline] (CAS No 67707-04-4), Red-5 3,3'-Bis(1-n-octyl-2-methylindol-3-yl)phthalide (CAS No 50292-95-0), Orange-6 6'-(Diethylamino)-3-oxo-spiro[isobenzofuran-1(3H),9'-[9H]xanthene]-2'-carboxylic acid ethyl ester (CAS No 154306-60-2), Blue-8 7-[4-(diethylamino)-2-ethoxyphenyl]-7-(2-methyl-1-octyl-1H-indol-3-yl) Furo[3,4-b]pyridin-5(7H)-one (CAS No 87563-89-1), Green-9 2'-(Dibenzylamino)-6'-(diethylamino)fluoran (CAS No 34372-72-0), Yellow-10 N,N-dimethyl-4-[2-[2-(octyloxy)phenyl]-6-phenyl-4-pyridinyl]-Benzenamine (CAS No 144190-25-0), Black-15 6'-(diethylamino)-2'-[(dimethylphenyl) amino]-3'-methylspiro [isobenzofuran-1(3H),9'-[9H]xanthene]-3-one (CAS No 36431-22-8), KetoAcid-1 4-(N,N-diethylamino)-2-hydroxy-2'-carboxybenzophenone (CAS No 5809-23-4), KetoAcid-2 4-(N,N-dibutylamino)-2-hydroxy-2'-carboxybenzaphenone (CAS No 54574-82-2), 2-Anilino-3-diethylamino-6-methylfluoran, 2-Anilino-6-dibutylamino-3-methylfluoran, 6-(Dimethylamino)-3,3-bis [4-(dimethylamino) phenyl] phthalide, 4,4'-[(9-butyl-9H-carbazol-3-yl)methylene]bis[N-methyl-N-phenylaniline], 3,3'-Bis(1-n-octyl-2-methylindol-3-yl)phthalide, 6'-(Diethylamino)-3-oxo-spiro [isobenzofuran-1(3H),9'-[9H]xanthene]-2'-carboxylic acid ethyl ester, 7-[4-(diethylamino)-2-ethoxyphenyl]-7-(2-methyl-1-octyl-1H-indol-3-yl) Furo[3, 4-b]pyridin-5(7H)-one, 2'-(Dibenzylamino)-6'-(diethylamino)fluoran, N,N-dimethyl-4-[2-[2-(octyloxy) phenyl]-6-phenyl-4-pyridinyl]-Benzenamine, and 6'-(diethylamino)-2'-[(di methyl phenyl) amino]-3'-methylspiro[isobenzofuran-1(3H),9'-[9H]xanthene]-3-one, 4,4'-[(9-butyl-9H-carbazol-3-yl)methylene]bis[N-methyl-N-phenylaniline] (CAS No. 67707-04-4), 6'-(diethylamino)-3-oxo-spiro[isobenzofuran-1(3H),9'-(9H)xanthene]-2'carboxylic acid ethyl ester (CAS No. 154306-60-2), and 2'-(dibenxylamino)-6'-(diethylamino)fluoran (CAS No. 34372-72-0).

Preferably, when the composition is a water-based composition, the leuco dye is selected from 2'-Anilino-6'-(dibutylamino)-3'-methyl-3H-spiro[2-benzofuran-1,9'-xanthen]-3-one (CAS No. 89331-94-2), 6'-(Diethylamino)-3'- methyl-2'-(phenylamino)spiro[2-benzofuran-3,9'-xanthene]-1-one (CAS No. 29512-49-0), and 2-Anilino-6'-[ethyl(p-toyl)amino]-3'-methylspiro[isobenzofuran-1 (3H), 9'-[9H]xanthene]-3-one (CAS No. 59129-79-2). More preferably, when the composition is a water-based composition, the leuco dye is 2-Anilino-6'-[ethyl(p-toyl)amino]-3'-methylspiro[isobenzofuran-1 (3H),9'-[9H]xanthene]-3-one (CAS No. 59129-79-2).

However, when the composition is an organic non-polar solvent-based composition, selection of the leuco dye needs to be more specific as organic solvents have been known to affect the interaction of a leuco dye and a colour developer, causing the premature formation of colour upon formulation and prior to application onto a substrate, such that subsequent formation of variable information and image(s) is not possible. Accordingly, not only is the use of 1,1,1-tris(4-hydroxyphenyl)ethane important, the selection of an appropriate leuco dye is also key. There is synergistic selection.

When the composition is an organic non-polar solvent-based composition, the leuco dye may be selected from 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro[2-benzofuran-3,9'-xanthene]-1-one (CAS No. 29512-49-0), 2-Anilino-6'-[ethyl(p-toyl)amino]-3'-methylspiro[isobenzofuran-1 (3H),9'-[9H]xanthene]-3-one (CAS No. 59129-79-2), Blue3-CVL 6-(dimethylamino)-3,3-bis-[4-(dimethylamino) phenyl] phthalide (CAS No 1522-42-7), Blue-4 4,4'-[(9-butyl-9H-carbazol-3-yl)methylene]bis[N-methyl-N-phenylaniline] (CAS No 67707-04-4), Red-5 3,3'-Bis(1-n-octyl-2-methylindol-3-yl)phthalide (CAS No 50292-95-0), Orange-6 6'-(Diethylamino)-3-oxo-spiro [isobenzofuran-1(3H),9'-[9H]xanthene]-2'-carboxylic acid ethyl ester (CAS No 154306-60-2), Blue-8 7-[4-(diethylamino)-2-ethoxyphenyl]-7-(2-methyl-1-octyl-1H-indol-3-yl) Furo[3,4-b]pyridin-5(7H)-one (CAS No 87563-89-1), Green-9 2'-(Dibenzylamino)-6'-(diethylamino)fluoran (CAS No 34372-72-0), Yellow-10 N,N-dimethyl-4-[2-[2-(octyloxy)phenyl]-6-phenyl-4-pyridinyl]-Benzenamine (CAS No 144190-25-0), Black-15 6'-(diethylamino)-2'-[(dimethylphenyl) amino]-3'-methylspiro [isobenzofuran-1(3H),9'-[9H]xanthene]-3-one (CAS No 36431-22-8), KetoAcid-1 4-(N,N-diethylamino)-2-hydroxy-2'-carboxybenzophenone (CAS No 5809-23-4), KetoAcid-2 4-(N, N-dibutylamino)-2-hydroxy-2'-carboxybenzophenone (CAS No 54574-82-2).

Preferably, when the composition is an organic non-polar solvent-based composition, the leuco dye is 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro[2-benzofuran-3,9'-xanthene]-1-one (CAS No. 29512-49-0), and 2-Anilino-6'-[ethyl(p-toyl)amino]-3'-methylspiro[isobenzofuran-1 (3H), 9'-[9H]xanthene]-3-one (CAS No. 59129-79-2). More preferably, when the composition is an organic non-polar solvent-based composition, the leuco dye is 2-Anilino-6'-[ethyl(p-toyl)amino]-3'-methylspiro[isobenzofuran-1 (3H), 9'-[9H]xanthene]-3-one (CAS No. 59129-79-2).

Preferably, for both water-based and organic non-polar solvent-based compositions, the leuco dye is not a pyridine-based leuco dye.

1,1,1-tris(4-hydroxyphenyl)ethane may be present in the composition of the present invention in any suitable amount. Preferably, the composition comprises 5 to 40 wt %, such as from 10 to 30 wt %, or even from 15 to 25 wt % of 1,1,1-tris(4-hydroxyphenyl)ethane. It will be appreciated that this encompasses both water-based and organic non-polar solvent-based compositions.

The leuco dye may be present in the composition of the present invention in any suitable amount. Preferably, the composition comprises from 1.5 to 40 wt %, such as from 3 to 30 wt %, or even from 5 to 25 wt % of the leuco dye. It will be appreciated that this encompasses both water-based and organic non-polar solvent-based compositions.

1,1,1-tris(4-hydroxyphenyl)ethane and the leuco dye may be present in the composition of the present invention in any suitable ratio. Preferably the composition comprises a ratio of 1,1,1-tris(4-hydroxyphenyl)ethane to leuco dye of from 1:1 to 5:1, such as from 2:1 to 4:1, or even from 2.5:1 to 3.5:1 including 3:1 based on wt % of 1,1,1-tris(4-hydroxyphenyl)ethane and leuco dye. It will be appreciated that this encompasses both water-based and organic non-polar solvent-based compositions.

The composition may further comprise an organic non-polar solvent, i.e. be an organic non-polar solvent-based composition. Alternatively, the composition may further comprise water, i.e. be a water-based composition.

According to a fifth aspect of the present invention, there is provided a composition comprising a leuco dye, 1,1,1-tris(4-hydroxyphenyl)ethane and an organic non-polar solvent.

According to a sixth aspect of the present invention, there is provided a composition comprising a leuco dye, 1,1,1-tris(4-hydroxyphenyl)ethane and an organic non-polar solvent, said composition being capable of forming an image on a substrate upon exposure of the composition to radiation when applied on the substrate and retaining said image for at least 1 day under conditions of at least 50% relative humidity.

According to a seventh aspect of the present invention, there is provided a composition comprising a leuco dye, 1,1,1-tris(4-hydroxyphenyl)ethane and an organic non-polar solvent, said composition being capable of forming an image on a substrate upon exposure of the composition to radiation when applied on the substrate and retaining said image for at least 1 day under conditions of from 0.1 to 100 g/kg specific humidity.

According to an eighth aspect of the present invention, there is provided a composition comprising a leuco dye, and 1,1,1-tris(4-hydroxyphenyl)ethane and water.

According to a ninth aspect of the present invention, there is provided a composition comprising a leuco dye, and 1,1,1-tris(4-hydroxyphenyl)ethane and water, said composition being capable of forming an image on a substrate upon exposure of the composition to NIR or IR radiation when applied on the substrate and retaining said image for at least 1 day under conditions of at least 50% relative humidity.

According to a tenth aspect of the present invention, there is provided a composition comprising a leuco dye, and 1,1,1-tris(4-hydroxyphenyl)ethane and water, said composition being capable of forming an image on a substrate upon exposure of the composition to NIR or IR radiation when applied on the substrate and retaining said image for at least 1 day under conditions of from 0.1 to 100 g/kg specific humidity.

All features of the above fifth to tenth aspects, and as discussed below as preferred or optional, are applicable to all other aspects described herein. In the same manner, all features of all other aspects described herein, whether preferred or optional, are applicable to the above fifth to tenth aspects of the present invention.

When the composition further comprises an organic non-polar solvent, the composition may be considered an organic non-polar solvent-based composition. It will be appreciated by a skilled person that for such a composition, no water is utilised as a component in the formulation process of the composition.

It has been surprisingly and advantageously found that when the composition is an organic non-polar solvent-based composition, the presence of 1,1,1-tris(4-hydroxyphenyl) ethane and selection of the leuco dye mean that the two components do not prematurely interact upon formulation to form colour, such that a colourless composition can be applied to a substrate and utilised to form a humidity-resistant image in the context of the present invention. Previously, colour-forming compounds and colour developers could not be utilised in organic solvent-based compositions on account of the solubilisation, dissolution, interaction and reaction between the two components (leuco dye and colour developer), resulting in premature colour formation and preventing their subsequent use in the production of variable information and image(s) on a substrate.

The compositions of the present invention are colourless during formulation, upon application to the substrate, and when applied to the substrate prior to exposure to the intended radiation to form an image(s). By the term "colourless" in relation to the composition of the present invention is meant a composition that is clear, white, or off-white and does not display colour during formulation, upon application to the substrate, and when applied to the substrate prior to exposure to the intended radiation to form an image(s). The composition is considered to lack colour or be colourless compared to the colour of the image formed following exposure to the radiation. It will be appreciated that the areas of the composition to which radiation is not applied during formation of an image will remain colourless, i.e. the 'background' of the composition.

Preferably, the composition, whether water- or organic non-polar solvent-based composition, is colourless or colourless upon application to the substrate and prior to application of any radiation thereto to cause formation of colour and generation of an image. It will be appreciated by skilled person that the part(s) of the composition, whether water- or organic non-polar solvent-based, to which radiation is not applied will remain colourless, i.e. the 'background' of the composition.

It has further been surprisingly and advantageously found that when the composition is an organic non-polar solvent-based composition, not only is it the presence of 1,1,1-tris (4-hydroxyphenyl)ethane and the selection of the leuco dye that is important, but the selection of the organic solvent, i.e. an organic non-polar solvent(s), is also important in order to prevent the 1,1,1-tris(4-hydroxyphenyl)ethane and leuco dye components from interacting upon formulation to form colour. There is further synergistic selection.

Accordingly, the composition may further comprise an organic non-polar solvent. It will be appreciated that the composition may comprise more than one organic non-polar solvent. The organic non-polar solvent may be an organic non-polar hydrocarbon solvent. Such organic non-polar solvents may be selected from alkane and cyclic hydrocarbons including but not limited to: xylene, pentane, cyclopentane, hexane, cyclohexane, toluene, methyl cyclohexane, benzene, heptane, cycloheptane, octane, cyclooctane and tetrahydrofuran, or combinations thereof. Preferably, the organic non-polar solvent is selected from xylene, cyclopentane, methylcyclohexane and toluene, or combinations thereof.

Accordingly, when the composition is an organic non-polar solvent-based composition, the leuco dye is preferably selected from 2'-Anilino-6'-(dibutylamino)-3'-methyl-3H-spiro[2-benzofuran-1,9'-xanthen]-3-one (CAS No. 89331-

94-2), 6'-(Diethylamino)-3'-methyl-2'-(phenylamino)spiro [2-benzofuran-3,9'-xanthene]-1-one (CAS No. 29512-49-0), 2-Anilino-6'-[ethyl(p-toyl)amino]-3'-methylspiro[isobenzo-furan-1 (3H),9'-[9H]xanthene]-3-one (CAS No. 59129-79-2), Blue3-CVL 6-(dimethylamino)-3,3-bis-[4-(dimethyl-amino) phenyl] phthalide (CAS No 1522-42-7), Blue-4 4,4'-[(9-butyl-9H-carbazol-3-yl)methylene]bis[N-methyl-N-phenylaniline] (CAS No 67707-04-4), Red-5 3,3'-Bis(1-n-octyl-2-methylindol-3-yl)phthalide (CAS No 50292-95-0), Orange-6 6'-(Diethylamino)-3-oxo-spiro [isobenzofuran-1(3H),9'49H]xanthene]-2'-carboxylic acid ethyl ester (CAS No 154306-60-2), Blue-8 7-[4-(diethylamino)-2-ethoxyphe-nyl]-7-(2-methyl-1-octyl-1H-indol-3-yl) Furo[3,4-b]pyri-din-5(7H)-one (CAS No 87563-89-1), Green-9 2'-(Diben-zylamino)-6'-(diethylamino)fluoran (CAS No 34372-72-0), Yellow-10 N,N-dimethyl-4-[2-[2-(octyloxy)phenyl]-6-phe-nyl-4-pyridinyl]-Benzenamine (CAS No 144190-25-0), Black-15 6'-(diethylamino)-2'-[(dimethylphenyl) amino]-3'-methylspiro [isobenzofuran-1(3H),9'-[9H]xanthene]-3-one (CAS No 36431-22-8), KetoAcid-1 4-(N,N-diethylamino)-2-hydroxy-2'-carboxybenzophenone (CAS No 5809-23-4), KetoAcid-2 4-(N, N-dibutylamino)-2-hydroxy-2'-carboxy-benzophenone (CAS No 54574-82-2), more preferably selected from 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro [2-benzofuran-3,9'-xanthene]-1-one (CAS No. 29512-49-0), and 2-Anilino-6'-[ethyl(p-toyl)amino]-3'-methylspiro [isobenzofuran-1 (3H),9'-[9H]xanthene]-3-one (CAS No. 59129-79-2), and most preferably 2-Anilino-6'-[ethyl(p-toyl)amino]-3'-methylspiro[isobenzofuran-1 (3H),9'-[9H] xanthene]-3-one (CAS No. 59129-79-2), and the organic non-polar solvent is selected from xylene, pentane, cyclo-pentane, hexane, cyclohexane, toluene, methyl cyclohexane, benzene, heptane, cycloheptane, octane, cyclooctane and tetrahydrofuran, preferably from xylene, cyclopentane, methylcyclohexane and toluene, or combinations thereof.

More preferably, when the composition is an organic non-polar solvent-based composition, the leuco dye is selected from 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino)spiro [2-benzofuran-3,9'-xanthene]-1-one (CAS No. 29512-49-0), 2-Anilino-6'-[ethyl(p-toyl)amino]-3'-methylspiro[isobenzo-furan-1 (3H),9'-[9H]xanthene]-3-one (CAS No. 59129-79-2), and the organic non-polar solvent is selected from xylene, cyclopentane, methylcyclohexane and toluene, or combinations thereof.

It is noted that when the composition is an organic non-polar solvent-based composition, in some embodiments, the composition may further comprise a small amount of an organic polar solvent. However, preferably the composition comprises solely organic non-polar solvents.

The organic non-polar solvent may be present in the composition in an amount of from 1 to 90 wt %, such as from 10 to 80 wt %, or even from 20 to 70 wt %.

When the composition further comprises water, the composition may be considered a water-based composition. In the context of the present invention, a water-based composition comprises less than 5 wt % of an organic solvent (any polar or non-polar organic solvent), such as less than 3 wt %. Preferably, no organic solvent (any polar or non-polar organic solvent) is utilised as a component in the formulation process of a water-based composition.

When the composition further comprises water, water may be present in the composition in an amount of from 1 to 90 wt %, such as from 10 to 80 wt %, or even from 20 to 70 wt %.

The composition may further comprise a binder. Suitable binders will be well known to a person skilled in the art. Typically, when the composition is a water-based composition, examples of suitable binders include, but are not limited to the following: polymeric binders such as acrylic copolymers, styrene copolymers, styrene-acrylic copolymers, styrene-maleic-acid copolymers and hydrogenated products thereof; vinyl polymers; polyvinyl butyral polyolefins and hydrogenated or epoxidised products thereof; aldehyde-containing polymers; epoxide-containing polymers; polyamides; polyesters; polyurethanes; sulphone-containing polymers; natural products and derivatives thereof; and combinations thereof. When the composition is an organic non-polar solvent-based composition, examples of suitable binders include those listed above. Typically, when the composition is an organic non-polar solvent-based composition, the binder is selected from polymeric binders such as acrylic copolymers, styrene copolymers, styrene-acrylic copolymers, styrene-maleic-acid copolymers and hydrogenated products thereof. The binder may be present in the composition in any suitable amount. Preferably, the composition, whether water- or organic non-polar solvent-based, comprises from 1 to 50 wt %, such as from 3 to 35 wt % and most preferably, from 6 to 20 wt % of binder.

The composition may further comprise a near-infrared (NIR) absorber. It will be appreciated that an NIR absorber may be included in the composition when NIR or IR radiation is to be utilised in the formation of an image(s). The NIR absorber is capable of enhancing absorption of the NIR or IR radiation, and thus enhancing the image(s) formed. Examples of suitable NIR absorbers include, but are not limited to the following: inorganic copper salts such as copper (II) hydroxyl phosphate; organic NIR dyes and pigments such as N,N,N',N'-tetrakis(4-dibutylaminophenyl)-p-benzoquinone bis(iminium hexafluoro-antimonate); non-stoichiometric inorganic compounds such as reduced indium tin oxide, reduced zinc oxide, reduced tungsten oxide (tungsten bronze), reduced doped tungsten oxide, reduced antimony tin oxide, or doped metal oxides such as aluminium-doped zinc oxide (AZO) and fluorine-doped tin oxide (FTO); conductive polymers such as poly polystyrene sulfonate (PEDOT); and combinations thereof. Preferably, the NIR absorber is a non-stoichiometric inorganic compound. Preferably, the composition comprises from 0.1 to 10 wt %, such as from 0.25 to 5 wt %, or even from 0.4 to 3 wt % of an NIR absorber.

The composition may further comprise a curable compound. Suitable curable compounds will be well known to a person skilled in the art. Examples of suitable curable compounds include, but are not limited to: any commercially available monomers, oligomers, monomer and oligomer mixtures, or photoinitiators. The curable compound may be present in the composition in any suitable amount.

The composition may further comprise an additive or combination of additives. Suitable additives will be well known to a person skilled in the art. Examples of suitable additives include, but are not limited to the following: polymers; light or energy absorbing agents; UV absorbers; surfactants; wetting agents; dispersant agent; antifoaming agents; flow and levelling agents; coefficient of friction surface modifiers; waxes; drying promoters; colourants such as pigments; tinting agents; gloss or matt enhancers; scuff, mar and abrasion improvers; fluorescent agents; plasticisers;

optical brighteners; oxidising or reducing agents; stabilisers; light stabilising agents such as hindered amines; rheology modifiers such as thickening or thinning agents; humectants; solvents; adhesion promoters; acid or base scavenging agents; retarders; defoamers; antifoaming agents; and combinations thereof. Preferably, the composition comprises 0.1 to 15 wt %, such as from 0.1 to wt %, or even from 0.1 to 5 wt % of additives.

The inventors of the present invention have further found that the presence of 1,1,1-tris(4-hydroxyphenyl)ethane in the composition of the present invention enables the composition to achieve 'heat-resistance' and be 'heat-resistant'. By 'heat resistance', 'heat resistant' or like terms used herein, is meant that the composition does not form colour upon exposure to high-temperatures, experienced during production or even during storage of a substrate having the composition applied thereto. As noted above, only the intended application of radiation to the composition facilitates formation of an image. The composition does not prematurely colour following application to the substrate and prior to the intended application of radiation to generate variable information and an image thereon, even when exposed to high temperature conditions whilst on the substrate. The composition thus remains colourless prior to the intended application of radiation thereto such that variable information generation and the formation of image(s) can be subsequently achieved. By 'high-temperature conditions' or 'high-temperature' is meant temperatures of from 80 to 200° C., including from 100 to 200° C., and from 120 to 160° C. In the context of the present invention, the composition is typically exposed to such high temperature conditions during production of a substrate such as a printed corrugated paper-based substrate or printed packaging following application of the composition to said paper-based substrate or substrate from which the packaging is to be formed, or during other processes to which a printed substrate may be subjected such as antibacterial sterilisation processes. Further details regarding these specific processes are detailed below. Such 'heat-resistance', i.e. the ability of the composition to not prematurely form colour following application to the substrate and prior to the application of radiation when exposed to such high temperature conditions can be demonstrated through measurement of a ΔE value which represents any measurable difference in L*a*b* colour of the composition. The difference in L*a*b* colour of a composition applied to a substrate but prior to the application of radiation, and a composition applied to a substrate and exposed to high temperature conditions, but prior to the application of radiation, can be compared to determine a ΔE value. A low ΔE measurement is preferred, indicating that there is little quantitative colour difference between the two samples being compared such that they can be considered qualitatively comparable and visually the same, i.e. no premature colouration has occurred. Typically, ΔE is measured using a spectrophotometer such as an X-rite Exact Spectrophotometer. It will be appreciated that measurement of ΔE will be effected by the overall conditions, including high-temperature, to which the composition is subjected. In the context of present invention, when measured under the lab-based conditions shown for Examples 2 and 3, a ΔE of 10 or less at 160° C. is preferred, such as a ΔE of 6 or less, or even a ΔE of 5 or less, such as a ΔE or 2 or less. Further, in the context of the present invention, 'heat-resistance' or 'heat-resistant' may also refer to a composition that is capable of retaining an image on a substrate for at least 1 day under high temperature conditions of 80 to 200° C., such as from 100 to 200° C., or even from 120 to 160° C., such that the image does not fade. In this case, the terms may also be used to refer to the image itself, i.e. an image that is retained on the substrate for at least 1 day under high temperature conditions of 80 to 200° C., such as from 100 to 200° C., or even from 120 to 160° C., such that the image does not fade. Such 'heat-resistance' can be demonstrated using measurement of ODB, ODC, ODM and ODY values as discussed herein in relation to all of the other aspects of the present invention, i.e. the image formed by the heat-resistance compositions have an ODB, ODC, ODM or ODC values of 1.0 or more over time. The time for which the image can be maintained, i.e. maintain an ODB, ODC, ODM or ODY value of 1.0 or more is the same as detailed herein for retention of the image under the relative humidity and specific humidity conditions detailed herein in relation to all other aspects of the present invention.

Preferably, the composition is both humidity-resistant and heat-resistant.

Preferably, when the composition is a water-based composition, the composition has a viscosity of from 30 to 35 seconds as measured using a DIN 4 flow cup (4 mm hole). Such measurement methods will be well-known to a skilled person.

Preferably, when the composition is an organic non-polar solvent-based composition, the composition has a viscosity of from 18 to 25 seconds as measured using a Zahn 2 flow cup (2 mm hole). Such measurement methods will be well known to a skilled person.

The composition may be formed through the combination of formulations containing different components of the composition, for example, the leuco dye may be in a separate formulation to 1,1,1-tris(4-hydroxyphenyl)ethane, the formulations being combined to form the composition. The composition may be formed through combination of a first formulation containing a leuco dye and a second formulation containing 1,1,1-tris(4-hydroxyphenyl)ethane. Each of the first and second formulations will have been subjected to a milling process separately prior to combination in order that the leuco dye and 1,1,1-tris(4-hydroxyphenyl)ethane are dispersed in each of the first and second formulations as solid particles.

According to an eleventh aspect of the present invention, there is provided a method of forming a composition comprising a leuco dye, 1,1,1-tri(4-hydroxyphenyl)ethane and water, the method comprising combining a first formulation containing the leuco dye as solid particles dispersed therein and a second formulation containing 1,1,1-tris(4-hydroxyphenyl)ethane as solid particles dispersed therein.

According to a twelfth aspect of the present invention, there is provided a method of forming a composition comprising a leuco dye, 1,1,1-tris(4-hydroxyphenyl)ethane and an organic non-polar solvent, the method comprising combining a first formulation containing the leuco dye as solid particles dispersed therein and a second formulation containing 1,1,1-tris(4-hydroxyphenyl)ethane as solid particles dispersed therein.

All features of the above eleventh and twelfth aspects, and as discussed below as preferred or optional, are applicable to all other aspects described herein. In the same manner, all features of all other aspects described herein, whether preferred or optional, are applicable to the above eleventh and twelfth aspects of the present invention.

Prior to combination of the first and second formulations, the first and second formulations are milled such that the leuco dye is dispersed in the first formulation as solids particles and 1,1,1-tris(4-hydroxyphenyl)ethane is dispersed in the second formulation as solid particles. The leuco dye and 1,1,1-tris(4-hydroxyphenyl)ethane are introduced into the first and second formulations in solid form. The formulations may be separately milled using techniques known in the art. In the context of the present invention, the first and second formulations are separately milled using a Silverson L4M mixer followed by mechanical particle size reduction processing by recirculation in an Eiger Torrance horizontal bead-mill with 1.5 mm YTZ (Yttria Zirconia) ceramic beads.

Typically, the milled first and second formulations are blended together (combined) using a Silverson L5M mixer.

In the composition formed according to the method of the eleventh and twelfth aspects of the present invention, the leuco dye and 1,1,1-tris(4-hydroxyphenyl)ethane components are dispersed as solid particles.

In the composition, the solid particles of 1,1,1-tris(4-hydroxyphenyl)ethane may have any suitable particle size distribution. Preferably, the particle size distribution of the solid particles of 1,1,1-tris(4-hydroxyphenyl)ethane is unimodal. Preferably, the D50 particle size distribution value of the solid particles of 1,1,1-tris(4-hydroxyphenyl)ethane is from 0.1 to 25 microns such as from 0.5 to 15 microns, or even from 1 to 10 microns including from 3 to 8 microns In the composition, the solid particles of the leuco dye may have any suitable particle size distribution. Preferably, the particle size distribution of the solid particles of the leuco dye is unimodal. Preferably, the D50 particle size distribution value of the solid particles of the leuco dye is from 0.1 to 25 microns such as from 0.5 to 15 microns, or even from 1 to 10 microns, including from 3 to 8 microns.

In the composition, the solid particles of 1,1,1-tris(4-hydroxyphenyl)ethane may have any suitable particle size distribution. Preferably, the particle size distribution of the solid particles of 1,1,1-tris(4-hydroxyphenyl)ethane is unimodal. Preferably, the D90 particle size distribution value of the solid particles of 1,1,1-tris(4-hydroxyphenyl)ethane is from 5 to 50 microns such as from 7.5 to 30 microns, or even from 10 to 25 microns In the composition, the solid particles of the leuco dye may have any suitable particle size distribution. Preferably, the particle size distribution of the solid particles of the leuco dye is unimodal. Preferably, the D90 particle size distribution value of the solid particles of the leuco dye is from 5 to 50 microns such as from 7.5 to 30 microns, or even from 10 to 25 microns Particle size distribution, D50 particle size distribution and D90 particle size distribution of 1,1,1-tris(4-hydroxyphenyl)ethane is measured using a Malvern Mastersizer 3000 according to ISO standard 13320:2009. Other particle size measurement techniques include the Hegman grind gauge and gravitational sedimentation. It will be appreciated that the particle size distribution, D50 particle size distribution and D90 particle size distribution of 1,1,1-tris(4-hydroxyphenyl)ethane are measured for the first and second formulation prior to combination to form the composition.

The milling of the first and second formulations is completed in order that the leuco dye is dispersed in the first formulation as solid particles and 1,1,1-tris(4-hydroxyphenyl)ethane is dispersed in the second formulation as solid particles. The particle size distribution of the solid particles is reduced such that the 1,1,1-tris(4-hydroxyphenyl)ethane and leuco dye components are homogeneously dispersed and suspended in the composition for transfer to the substrate during application of the composition thereto by any of the printing processes, i.e. methods of application, discussed below.

The composition may be applied to any suitable substrate. It will be appreciated that the components of the composition will vary depending upon the substrate to which the composition is to be applied.

According to a thirteenth aspect of the present invention, there is provided a substrate comprising a composition applied thereto, the composition comprising a leuco dye and 1,1,1-tris(4-hydroxyphenyl)ethane.

According to a fourteenth aspect of the present invention, there is provided a substrate comprising a composition applied thereto, the composition comprising a leuco dye and 1,1,1-tris(4-hydroxyphenyl)ethane, said composition being capable of forming an image on the substrate upon exposure of the composition to NIR or IR radiation and retaining said image for at least 1 day under conditions of at least 50% relative humidity.

According to a fifteenth aspect of the present invention, there is provided a substrate comprising a composition applied thereto, the composition comprising a leuco dye and 1,1,1-tris(4-hydroxyphenyl)ethane, said composition being capable of forming an image on the substrate upon exposure of the composition to NIR or IR radiation and retaining said image for at least 1 day under conditions of from 0.1 to 100 g/kg specific humidity.

According to a sixteenth aspect of the present invention, there is provided a substrate comprising a composition applied thereto, the composition comprising a leuco dye, 1,1,1-tris(4-hydroxyphenyl)ethane and an organic non-polar solvent.

According to a seventeenth aspect of the present invention, there is provided a substrate comprising a composition applied thereto, the composition comprising a leuco dye, 1,1,1-tris(4-hydroxyphenyl)ethane and an organic non-polar solvent, said composition being capable of forming an image on the substrate upon exposure of the composition to radiation and retaining said image for at least 1 day under conditions of at least 50% relative humidity.

According to a eighteenth aspect of the present invention, there is provided a substrate comprising a composition applied thereto, the composition comprising a leuco dye, 1,1,1-tris(4-hydroxyphenyl)ethane and an organic non-polar solvent, said composition being capable of forming an image on the substrate upon exposure of the composition to radiation and retaining said image for at least 1 day under conditions of from 0.1 to 100 g/kg specific humidity.

According to a nineteenth aspect of the present invention, there is provided a paper-based substrate comprising a composition applied thereto, said composition comprising a leuco dye and 1,1,1-tris(4-hydroxyphenyl)ethane.

According to a twentieth aspect of the present invention, there is provided a paper-based substrate comprising a composition applied thereto, said composition comprising a leuco dye and 1,1,1-tris(4-hydroxyphenyl)ethane, and being capable of forming an image on the paper-based substrate upon exposure of the composition to NIR or IR radiation and retaining said image for at least 1 day under conditions of at least 50% relative humidity.

According to a twenty-first aspect of the present invention, there is provided a paper-based substrate comprising a composition applied thereto, said composition comprising a leuco dye and 1,1,1-tris(4-hydroxyphenyl)ethane, and being capable of forming an image on the paper-based substrate upon exposure of the composition to NIR or IR radiation and retaining said image on the for at least 1 day under conditions of from 0.1 to 100 g/kg specific humidity.

All features of the above thirteenth to twenty-first aspects, and as discussed below as preferred or optional, are applicable to all other aspects described herein. In the same manner, all features of all other aspects described herein, whether preferred or optional, are applicable to the above thirteenth to twenty-first aspects of the present invention.

The composition of the present invention may be applied to any suitable substrate used in the packaging industry.

The composition applied to the substrate to form the substrates according to the thirteenth to twenty-first aspect of the present invention may further comprise an organic non-polar solvent, i.e. be an organic non-polar solvent-based composition, or further comprise water, i.e. be a water-based composition, as detailed above in relation to all other aspects of the present invention. Preferably, the composition applied to the substrate to form the substrates according to the thirteenth to twenty-first aspects further comprise an organic non-polar solvent, i.e. are organic non-polar solvent-based compositions. Preferably, the composition applied to the substrate to form the substrates according to the thirteenth to twenty-first aspects further comprise water, i.e. are water-based compositions. It will be appreciated by a skilled person that upon application of the composition to a substrate using the methods detailed below, the majority of the organic non-polar solvent or water in the composition is lost by virtue of the application methods detailed herein such that no or only residual water or solvent is left in the composition on the substrate.

When the composition which is applied to form the substrate according to any of the thirteenth to twenty-first aspects further comprises an organic non-polar solvent, i.e. is an organic non-polar solvent-based composition, the substrate to which the organic non-polar solvent-based composition is applied may be selected from, but not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; aluminium foils and aluminium heat-sealable foils; textiles; paper-based substrates such as paper, card, carton, paperboard, cartonboard, cardboard, corrugated paper, corrugated card, corrugated carton, corrugated paperboard, corrugated cartonboard, corrugated cardboard, folding carton and equivalent recycled analogues, or combinations thereof; ceramics; foodstuffs and pharmaceutical preparations; or combinations thereof, e.g. polymer lined paper. Suitable substrates include multi-layered constructions formed from the materials and substrates listed above. The polymer and recycled polymer materials may be in the form of polymer foil or film substrates.

Preferably, the substrate to which the organic non-polar solvent-based composition is applied is selected from polyethylene terephthalate (PET), polyethylene (PE), low density polyethylene (LDPE), high density polyethylene (HDPE), polypropylene (PP), orientated polypropylene (OPP), and biaxially orientated polypropylene (BOPP). Typically, these polymer materials are in the form of polymer foil or film, preferably polymer film substrates.

It will be further appreciated that the organic non-polar solvent-based compositions of the present invention are advantageous for printing onto low surface energy synthetic thermoplastic films such as those used in the flexible packaging industry.

The substrate to which an organic non-polar solvent-based composition is applied may have a thickness of from 12 microns to 12 mm, such as from 20 microns to 1 mm and including from 25 to 500 microns, or even from 30 to 250 microns.

When the composition which is applied to form the substrate according to any of the thirteenth to twenty-first aspects further comprises water, i.e. is a water-based composition, the substrate to which the composition is applied may be selected from, but not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; aluminium foils and aluminium heat-sealable foils; textiles; paper-based substrates such as paper, card, carton, paperboard, cartonboard, cardboard, corrugated paper, corrugated card, corrugated carton, corrugated paperboard, corrugated cartonboard, corrugated cardboard, folding carton and equivalent recycled analogues, or combinations thereof; ceramics; foodstuffs and pharmaceutical preparations; or combinations thereof, e.g. polymer lined paper. Suitable substrates include multi-layered constructions formed from the materials and substrates listed above. The polymer and recycled polymer materials may be in the form of polymer foil or film substrates.

Preferably, when the composition applied to the substrate is a water-based composition, the substrate to which the composition is applied is a paper-based substrate. Suitable paper-based substrates include, but are not limited to the following: substrates formed of paper, card, carton, cartonboard, cardboard, paperboard, folding carton and recycled analogues thereof, or combinations thereof. Essentially, any substrate or medium formed from paper fibres, including natural fibres such as cellulose fibres derived from wood, rags, grasses or other vegetable sources, or paper pulp, is encompassed by the term 'paper-based'. The paper-based substrates may also be coated with typical coatings known in the art. In the context of the present invention, the paper-based substrates are other than thermal paper or carbonless paper.

The paper-based substrate may be non-corrugated, i.e. in non-corrugated form, such as a paper liner or sheet.

The paper-based substrate may be a corrugated paper-based substrate, such as corrugated paperboard, corrugated cartonboard, corrugated cardboard, corrugated paper, corrugated card or corrugated carton. A corrugated paper-based substrate is well known to a person skilled in the art and is typically formed of a corrugated (fluted) paper-based medium bonded to one or more non-corrugated (non-fluted) paper-based substrate such as a paper liner. The paper-based medium may be formed of paper, card, carton, cartonboard, cardboard, paperboard, folding carton and recycled analogues thereof, or combinations thereof, i.e. the same materials detailed above for paper-based substrates. The corrugated paper-based medium and one or more non-corrugated paper-based substrates such as paper liners are typically formed of the same material having the same or different grades. The corrugated paper-based medium and one or more non-corrugated paper-based substrates are typically provided as sheets.

Typically, the one or more non-corrugated paper-based substrates are bonded to both sides of the corrugated paper-based medium sheet using a standard hot melt adhesive, such that a 'sandwich' structure is formed of, for example, two outer paper liners joined by the inner corrugated paper-based medium. This is known in the art as a single wall corrugated paper-based substrate. It will be appreciated that additional alternate layers of the corrugated paper-based medium and non-corrugated paper-based substrates such as paper liners can be added to the single wall corrugated paper-based substrate to produce double wall (3 non-corrugated paper-based liners joined by two corrugated paper-based mediums) and triple wall (4 non-corrugated paper-based liners joined by three corrugated paper-based mediums) paper-based substrates to provide rigid layered packaging. The corrugated (fluted) paper-based medium may have different sizes of corrugation (fluting) as well known in the art. These are denoted as A (5 mm), B (3 mm), C (4 mm), E (2 mm) and F (1 mm) fluting. Suitable hot melt adhesives are well known by those skilled in the art.

It will be appreciated that in the context of the present invention, and as discussed below in more detail, the composition can be applied to the corrugated paper-based substrate either before (pre-printing) or after (post-printing) its formation into a corrugated paper-based substrate. Pre-printing prior to formation of a paper-based substrate into a corrugated paper-based substrate has previously been difficult due to the typically high-temperature and high-humidity conditions to which the paper-based substrate is exposing during the corrugation process.

The paper-based substrate to which a water-based composition is applied may have a weight per unit area (gsm) of from 50 to 500 gsm, such as from 60 to 250 gsm and including from 80 to 200 gsm.

It will be appreciated that the substrate to which the composition is applied may itself be applied to a further substrate. Examples of further substrates include, but are not limited to: polymers and recycled polymer materials such as polyethylene terephthalate (PET), polyethylene (PE), low density polyethylene (LDPE), high density polyethylene (HDPE), polystyrene (PS), polypropylene (PP), orientated polypropylene (OPP), biaxially orientated polypropylene (BOPP), cast polypropylene (CPP), polyamide (PA) such as nylon, polyvinyl chloride (PVC), or combinations thereof; cellulose; glass; plastic; metal and metal foils such as tinplate; textiles; paper-based substrates such as paper, card, carton, paperboard, cartonboard, cardboard, corrugated paper, corrugated card, corrugated carton, corrugated paperboard, corrugated cartonboard, corrugated cardboard, folding carton and equivalent recycled analogues, or combinations thereof; ceramics; foodstuffs and pharmaceutical preparations; or combinations thereof, e.g. polymer lined paper. Suitable substrates include multi-layered constructions formed from the materials and substrates listed above. The polymer and recycled polymer materials may be in the form of polymer foil or film substrates.

The composition, or substrate to which the composition has been applied, of any of the aspects of the present invention may be suitable for end use in primary, secondary and tertiary packaging such as in shelf-ready or retail-ready packaging, aseptic container packaging, on labels (adhesive or wraparound) and/or in fast-moving consumer goods (FMCGs), packaging such as disposable packaging including food and hot or cold beverage containers; hygiene and personal care product packaging such as shampoo bottles; cosmetic product packaging; decorative metal products; blister pack packaging, laminated pouches; and medical and diagnostic devices and associated packaging.

The substrate to which the composition has been applied may further comprise an adhesive layer or be a self-adhesive substrate such as a self-adhesive label. It will be appreciated that this adhesive layer or the adhesive of the self-adhesive substrate is operable to apply the substrate to the further substrate or any other material and is therefore on an exterior surface of the substrate. The adhesive layer or the adhesive portion of the self-adhesive substrate may cover all, sub- stantially all, or part of the surface area of an exterior surface of the substrate. When the composition is applied to the substrate, the adhesive layer or adhesive portion of the self-adhesive substrate is preferably on an exterior surface of the substrate other than that to which the composition is applied.

The substrate to which the composition has been applied may comprise single or multiple layers of the composition applied thereto.

The substrate may comprise one or more additional layers applied thereto so as to form a multi-layer construction. The multi-layer construction may comprise a plurality of discrete layers applied thereon. The plurality of discrete layers includes a layer of the composition of the present invention, which may be formed of single or multiple layers of the compositions applied thereto, and one or more additional layers. Suitable additional layers may be selected from, but are not limited to: thermal insulating layers, protective layers, primer layers, adhesion promoting layers, and radia- tion blocking layers such as a UV blocking layer, quenching layers, hindered amine light stabilisers, and combinations thereof. The multi-layer constructions may be a laminated structure. Suitable additional layers may also be selected from substrates such as substrates formed of the polymer and recycled polymer materials detailed above in the form of polymer foil or film substrates.

The composition may be applied to the substrate by any suitable process.

According to a twenty-second aspect of the present inven- tion, there is provided a method of forming a substrate having a composition applied thereon, the method compris- ing applying a composition comprising a leuco dye, 1,1,1- tris(4-hydroxyphenyl)ethane and an organic non-polar sol- vent, to the substrate.

According to a twenty-third aspect of the present inven- tion, there is provided method of forming a paper-based substrate having a composition applied thereon, the method comprising applying a composition comprising a leuco dye and 1,1,1-tris(4-hydroxyphenyl)ethane to the paper-based substrate.

All features of the above twenty-second and twenty-third aspects, and as discussed below as preferred or optional, are applicable to all other aspects described herein. In the same manner, all features of all other aspects described herein, whether preferred or optional, are applicable to the above twenty-second and twenty-third aspects of the present inven- tion.

When the composition further comprises an organic non- polar solvent, i.e. is an organic non-polar solvent-based composition, methods of applying the composition to a substrate, i.e. printing, will be well known to a person skilled in the art. Suitable application methods include, but are not limited to the following: flexographic printing, gravure printing, flatbed and rotary screen printing, offset printing, pad printing, air knife and meyer bar coating. Flexographic printing is in compliance with ISO 2834-2.

When the composition further comprises water, i.e. is a water-based composition, methods of applying the compo- sition to a substrate, preferably a paper-based substrate, i.e. printing, will be well known to a person skilled in the art. Suitable application methods include, but are not limited to the following: flexographic printing, gravure printing, screen printing, air knife and meyer bar coating. Preferably, flexographic printing is utilised. For the production of printed corrugated paper-based substrates, it is noted that the composition can now be applied either to a paper-based substrate prior to its formation into a printed corrugated paper-based substrate (pre-printing), or following the pro- duction of a corrugated paper-based substrate (post-print- ing). Further details relating to the application of the com- position prior to the production of the printed corrugated paper-based substrate (pre-printing) are detailed below. Flexographic printing is in compliance with ISO 2834-2.

It will be appreciated by a skilled person that upon application of the composition to a substrate using the methods detailed above, the majority of the organic non- polar solvent or water in the composition is lost by virtue of the application methods detailed herein such that no or only residual water or solvent is left.

The composition may be applied to all, substantially all or part of the surface area of an exterior surface of the substrate. For example, it will be appreciated that the composition may be applied to a 'patch' of the exterior surface or side of the substrate in order to provide variable information and for- mation of an image(s) at that particular patch of the sub- strate. The composition may be applied on a substrate to any suitable dry coating weight (gsm) and dry coating thickness (microns) dependent upon both the substrate to which the composition is applied and the application method. It will be appreciated by a skilled person that the dry coating weight (gsm) and dry coating thickness (microns) of the composi- tion on the substrate will affect the density of the image formed.

When the composition further comprises an organic non- polar solvent, i.e. is an organic non-polar solvent-based composition, the organic non-polar solvent-based composi- tion is preferably applied to a dry coating weight of from 1.5 to 15 gsm (grams per square metre), such as from 2.5 to 10 gsm, and most preferably from 4 to 8 gsm. It will be appreciated that the dry coating weight is the final weight of the composition on the substrate and typically requires multiple layers of the composition to be applied thereto.

When the composition further comprises water, i.e. is a water-based composition, the water-based composition is preferably applied to a dry coating weight of from 1.5 to 15 gsm (grams per square metre), such as from 2.5 to 10 gsm, and most preferably from 4 to 8 gsm. It will be appreciated that the dry coating weight is the final weight of the composition on the substrate and typically requires multiple layers of the composition to be applied thereto.

The dry coating weight may be measured by any suitable method. Suitable measuring methods will be well known to those skilled in the art. For the present invention, the dry coating weight is measured by weighing the same unit area of substrate (for example 100 cm$^2$) with and without the composition applied thereto, and assessing the difference between two weights.

When the composition further comprises an organic non- polar solvent, i.e. is an organic non-polar solvent-based composition, the organic non-polar solvent-based composi- tion is preferably applied to a dry coating thickness of from 2 to 15 microns, such as from 3 to 10 microns, and most preferably from 4 to 8 microns. It will be appreciated that the dry coating thickness is the final thickness of the composi- tion on the substrate and typically requires multiple layers of the composition to be applied thereto.

When the composition further comprises water, i.e. is a water-based composition, the water-based composition is preferably applied to a dry coating thickness of from 2 to 15 microns, such as from 3 to 10 microns, and most preferably from 4 to 8 microns. This dry coating thickness is per individual layer of the composition that is applied to the substrate. It will be appreciated that the dry coating thickness is the final thickness of the composition on the substrate and typically requires multiple layers of the composition to be applied thereto.

The dry coat thickness (microns) may be measured by any suitable method. Suitable measuring methods will be well known to those skilled in the art. For the present invention, dry coat thickness is measured by using a micrometer such as a handheld digital micrometer.

The composition may be applied to the substrate as a single layer or as multiple layers.

The composition may be applied to the substrate as an undercoat or an overcoat, on top of a primer or as a primer layer. The composition may be applied to the substrate once or multiple times. The composition may be applied to at least part, or all, of an exterior surface of the substrate.

An additional use of the composition in the formation of packaging has been identified by the present inventors. The present inventors have surprisingly and advantageously found that the compositions of the present invention can be applied to many substrates suitable for use in the packaging industry prior to exposure of the substrates to high temperature and/or high humidity conditions during manufacture, conversion or processing into packaging, or other antibacterial, antimicrobial or antiviral process to which the substrates may be exposed. The compositions of the present invention do not prematurely colour under such high temperature and/or high-humidity conditions, and subsequent variable information formation through the production of an images(s) on the resulting packaging or substrate is achievable. Such pre-printing of the substrates prior to exposure to high temperature and/or high-humidity conditions would not have been previously possible as the leuco dye and colour developers of previously known radiation-reactive compositions would interact under these conditions such that formation of variable information on the resulting packaging or substrates was not possible.

Furthermore, the present inventors have surprisingly and advantageously found that the composition of the present invention can be applied to many substrates suitable for use in the packaging industry prior to exposure of the substrates to high temperature and/or high humidity conditions during transport and storage. This exposure to high temperature and/or high humidity conditions may be from either the imaged or unimaged printed substrate, but preferably for imaged printed substrates to which the composition has been applied and then an image formed using radiation.

According to a twenty-fourth aspect of the present invention, there is provided a process for manufacturing packaging from a printed substrate comprising applying a composition to a substrate to form a printed substrate, wherein the composition comprises a leuco dye and 1,1,1-tris(4-hydroxyphenyl)ethane, and subsequently forming the printed substrate into packaging during which the printed substrate is exposed to temperatures of from 80 to 200° C. and/or conditions of at least 50% relative humidity.

According to a twenty-fifth aspect of the present invention, there is provided a process for manufacturing packaging from a printed substrate comprising applying a composition to a substrate to form a printed substrate, wherein the composition comprises a leuco dye and 1,1,1-tris(4-hydroxyphenyl)ethane, and subsequently forming the printed substrate into packaging during which the printed substrate is exposed to temperatures of from 80 to 200° C. and/or conditions of from 0.1 to 100 g/kg specific humidity.

According to a twenty-sixth aspect of the present invention, there is provided a process comprising applying a composition to a substrate to form a printed substrate, wherein the composition comprises a leuco dye and 1,1,1-tris(4-hydroxyphenyl)ethane and subsequently exposing the printed substrate to temperatures of from 80 to 200° C. and/or conditions of at least 50% relative humidity.

According to a twenty-seventh aspect of the present invention, there is provided a process comprising applying a composition to a substrate to form a printed substrate, wherein the composition comprises a leuco dye and 1,1,1-tris(4-hydroxyphenyl)ethane and subsequently exposing the printed substrate to temperature of from 80 to 200° C. and/or conditions of from 0.1 to 100 g/kg specific humidity.

According to a twenty-eighth aspect of the present invention, there is provided a process comprising applying a composition to a substrate to form a printed substrate, wherein the composition comprises a leuco dye and 1,1,1-tris(4-hydroxyphenyl)ethane and subsequently exposing the composition to radiation to form an imaged printed substrate and then exposing the imaged printed substrate to temperatures of from 80 to 200° C. and/or conditions of at least 50% relative humidity.

According to a twenty-ninth aspect of the present invention, there is provided a process comprising applying a composition to a substrate to form a printed substrate, wherein the composition comprises a leuco dye and 1,1,1-tris(4-hydroxyphenyl)ethane and subsequently exposing the composition to radiation to form an imaged printed substrate and then exposing the imaged printed substrate to temperature of from 80 to 200° C. and/or conditions of from 0.1 to 100 g/kg specific humidity.

All features of the above twenty-fourth to twenty-ninth aspects, and as discussed below as preferred or optional, are applicable to all other aspects described herein. In the same manner, all features of all other aspects described herein, whether preferred or optional, are applicable to the above twenty-fourth to twenty-ninth aspects of the present invention.

By 'printed substrate' and like terms used herein is meant a substrate to which the composition of the present invention has been applied, typically by a printing process such as those detailed above. The printed substrate may be 'imaged' or 'unimaged', i.e. radiation may have been applied to the composition on the printed substrate to form an image, or this has not yet occurred. In the context of the twenty-fourth to twenty-ninth aspects of the present invention in particular, the printed substrate refers to an unimaged substrate, i.e. prior to the application of radiation thereto.

In the context of the present invention, the term 'packaging' refers to all suitable packaging including but not limited to: boxes, containers, plastic bags, stretch films, primary, secondary and tertiary packaging such as in shelf-ready or retail-ready packaging or FMCGs, aseptic container packaging; labels (adhesive or wraparound); disposable packaging including food and hot or cold beverage containers; hygiene and personal care product packaging such as shampoo bottles; cosmetic product packaging; decorative metal products; blister pack packaging, laminated pouches; and medical and diagnostic devices and associated packaging.

For the twenty-fourth to twenty-ninth aspects of the present invention, the composition and substrate is as detailed above in relation to all other aspects of the present invention detailed herein, and the composition may be applied to the substrate using the methods detailed above in relation to all other aspects of the present invention.

During formation of the printed substrate into packaging, the printed substrate is typically exposed to high temperature and/or high humidity conditions. The composition does not form prematurely colour under such conditions. The composition can thus be considered to be heat-resistant and humidity-resistant. The printed substrate may be exposed to temperatures of from 100 to 200° C., such as from 120 to 160° C. Such 'heat-resistance' may be demonstrated through measurement of a ΔE value which represents any measurable difference in L*a*b* colour of the composition. The difference in L*a*b* colour of a composition applied to a substrate but not exposed to such high temperature conditions and prior to the application of radiation, and a composition applied to a substrate and exposed to temperature of from 80 to 100° C., but prior to the application of radiation, can be compared to determine a ΔE value. A low ΔE measurement is preferred, indicating that there is little quantitative colour difference between the two samples being compared such that they can be considered qualitatively comparable and visually the same, i.e. no premature colouration has occurred. Typically, ΔE is measured using a spectrophotometer such as an X-rite Exact Spectrophotometer. It will be appreciated that measurement of ΔE will be effected by the overall conditions, including high-temperature, to which the composition is subjected. In the context of present invention, when measured under the lab-based conditions shown for Examples 2 and 3, a ΔE of, for example, 10 or less at 160° C. is preferred, such as a ΔE of 6 or less, or even a ΔE of 5 or less, such as a ΔE of 2 or less. In the context of the twenty-fifth to twenty-seventh aspects of the present invention, 'humidity-resistant' refers to a composition that does not prematurely colour upon exposure to conditions of at least 50% relative humidity or conditions of from 0.1 to 100 g/kg specific humidity. The printed substrate may be exposed to conditions of at least 50% relative humidity, such as at least 60% relative humidity, or at least 70% relative humidity, such as at least 80% relative humidity, or even at least 90% relative humidity. The upper limit for these relative humidity values is 100% relative humidity. The printed substrate may be exposed to conditions of from 50 to 100% relative humidity, such as from 50 to 90% relative humidity, including from 50 to 70% relative humidity such as from 50 to 60% relative humidity and from 70 to 100% relative humidity such as from 70 to 90% relative humidity. Measurement of relative humidity values and associated temperature and pressures are as detailed above in relation to all other aspects of the present invention. The printed substrate may be exposed conditions of from 0.1 to 100 g/kg specific humidity, such as from 1 to 80 g/kg, or from 2 to 75 g/kg, or from 4 to 60 g/kg, or even from 8 to 50 g/kg. Measurement of specific humidity values are as detailed above in relation to all other aspects of the present invention. Such 'humidity-resistance' may also be demonstrated through measurement of a ΔE value which represents any measurable difference in L*a*b* colour of the composition. The difference in L*a*b* colour of a composition applied to a substrate but not exposed to such high-humidity conditions and prior to the application of radiation, and a composition applied to a substrate and exposed to conditions of at least 50% relative humidity or from 0.1 to 100 g/kg specific humidity, but prior to the application of radiation, can be compared to determine a ΔE value. A low ΔE measurement is preferred, indicating that there is little quantitative colour difference between the two samples being compared such that they can be considered qualitatively comparable and visually the same, i.e. no premature colouration has occurred. Typically, ΔE is measured using a spectrophotometer as discussed herein.

As for all other aspects of the present invention, the composition, whether water- or organic non-polar solvent-based, is colourless upon application to the substrate and prior to application of any radiation thereto to cause formation of colour and generation of an image. For the present invention, and in particular in relation to the twenty-fourth to twenty-ninth aspects of the present invention, the composition will remain colourless following formation of the printed substrate into packaging. For the present invention, and in particular in relation to the twenty-fourth to twenty-ninth aspects of the present invention, the composition will remain colourless following exposure of the printed substrate to temperatures of from 80 to 200° C. and/or conditions of from 0.1 to 100 g/kg specific humidity, and upon exposure to temperatures of from 80 to 200° C. and/or at least 50% relative humidity.

Examples of manufacture of packaging using printed substrates having the composition applied thereto as detailed in the twenty-fourth and twenty-fifth aspects of the present invention include the use of heat tunnel conveyor systems for shrink wrapping of printed thermal shrink film and the manufacture of aseptic packaging, during which a printed substrate can be exposed to high temperature conditions during formation and sealing of the multi-layer packaging product. Other packaging manufacture processes according to the twenty-fourth and twenty-fifth aspects of the present invention include the manufacture of blister packs, wherein a printed heat-sealable aluminium foil is heated externally to cause melting of a pre-applied hot melt glue such that the printed foil can be applied to a pre-filled blister packaging under pressure to seal the foil thereto.

Examples of the processes of the twenty-sixth and twenty-seventh aspects of the present invention include the exposure of printed substrates to high temperature and/or high humidity conditions for antibacterial, anti-germicidal, anti-microbial and antiviral purposes such as during steam sterilisation and retort conditions to ensure the hygiene, food safety and sanitisation of substrates and packaging for the health of the customer and consumer. The process of the twenty-sixth and twenty-seventh aspects of the present invention also includes the exposure of the printed substrate to the stated high temperature and high-humidity conditions during transport and storage. This is the same for the processes of the twenty-eighth and twenty-ninth aspects of the present invention.

An additional process for the application of the composition, specifically a water-based composition, to a paper-based substrate has been identified by the present inventors in the production of printed corrugated paper-based substrates. Previously, to form such printed corrugated paper-based substrates, application of radiation-reactive compositions comprising leuco dyes and colour developers was only possible after production of the corrugated paper-based substrates had been completed, as the conditions of the manufacturing process would cause the leuco dye and colour developer of the previously-applied radiation-reactive composition to prematurely interact and form colour, such that the composition could not then be utilised to produce variable information and provide an image(s) on a substrate. The composition of the present invention overcomes this problem.

According to a thirtieth aspect of the present invention, there is provided a process for manufacturing a printed corrugated paper-based substrate comprising: applying a composition to a paper-based substrate to form a printed paper-based substrate, wherein the composition comprises a leuco dye and 1,1,1-tris(4-hydroxyphenyl)ethane, and subsequently forming the printed paper-based substrate into a printed corrugated paper-based substrate.

All features of the above thirtieth aspect, and as discussed below as preferred or optional, are applicable to all other aspects described herein. In the same manner, all features of all other aspects described herein, whether preferred or optional, are applicable to the above thirtieth aspect of the present invention.

The composition for use in the process according to the thirtieth aspect of the present invention is the water-based composition of the present invention. As detailed in relation to all of the aspects of the present invention, the composition of the resulting printed corrugated paper-based substrate of the thirtieth aspect of the present invention is capable of forming and retaining an image on the printed corrugated paper-based substrate for at least 1 day under conditions of at least 50% relative humidity or under conditions of from 0.1 to 100 g/kg specific humidity.

The composition may be initially applied to the paper-based substrates using any of the methods detailed above as suitable for use in the application of water-based compositions to paper-based substrates. Preferably, the composition is initially applied to a paper-based substrate using flexographic printing. A skilled person will appreciate that there are many different commercially available flexographic printing machines. For the present invention, a Flexiproofer 100 from RK PrintCoat Instruments Ltd is suitable. It will be appreciated that the paper-based substrate to which the composition is initially applied is typically a non-corrugated paper-based substrate such as a paper liner. The resulting printed paper-based substrate, preferably a printed paper liner, is then utilised to produce a printed corrugated paper-based substrate.

The manufacture of printed corrugated paper-based substrates may be carried out using industrial corrugation apparatus. There are many different commercially available corrugation apparatus of which a skilled person would be aware. Such apparatus, and its operation, will be well known to a person skilled in the art. Typically, the manufacture of the printed corrugated paper-based substrates is a continuous process.

Typically, to produce a printed corrugated paper-based substrate, the printed paper-based substrate, such as the printed paper liner, is bonded using standard hot melt adhesive to a corrugated (fluted) paper-based medium, said corrugated paper-based medium having been separately subjected to preparation and corrugation-forming processes on the same apparatus. A further non-corrugated paper-based substrate, typically another paper liner, is then bonded on the apparatus using standard hot melt adhesive to the opposite side of the corrugated paper-based medium to the printed paper liner to form a printed corrugated paper-based substrate. This further non-corrugated paper-based substrate may also be a printed non-corrugated paper-based substrate such as a paper liner having the composition of the present invention applied thereto, or an unprinted non-corrugated paper-based substrate such as a paper liner without the composition of the present invention applied thereto. The corrugated paper-based medium and non-corrugated paper-based substrates (whether printed or unprinted) are as defined above in relation to all other aspects of the present invention detailed herein. The non-corrugated paper-based substrates are typically paper liners. The corrugated paper-based medium and non-corrugated paper-based substrates (whether printed or unprinted) are typically formed of the same material having the same or different grades. The corrugated paper-based medium and non-corrugated paper-based substrates (whether printed or unprinted) are typically provided as sheets. Typically, the non-corrugated paper-based substrates such as paper liners (whether printed or unprinted) are bonded to both sides of the corrugated paper-based medium sheet using the standard hot melt adhesive, such that a 'sandwich' structure is formed of, for example, two outer paper liners joined by the inner corrugated paper-based medium. This is known in the art as a single wall corrugated paper-based substrate. It will be appreciated that additional alternate layers of the corrugated paper-based medium and non-corrugated paper-based substrates (whether printed or unprinted) such as paper liners can be added to the single wall corrugated paper-based substrate to produce double wall (3 non-corrugated paper-based liners joined by two corrugated paper-based mediums) and triple wall (4 non-corrugated paper-based liners joined by three corrugated paper-based mediums) paper-based substrates to provide rigid layered packaging. It will be appreciated that the printed non-corrugated paper-based substrate(s) such as a printed paper liner(s) will be on the exterior of the structure such that variable information can be generated through formation of an image(s) on the composition(s) on the printed liner(s). The corrugated (fluted) paper-based medium may have different sizes of corrugation (fluting) as well known in the art. These are denoted as A (5 mm), B (3 mm), C (4 mm), E (2 mm) and F (1 mm) fluting. Suitable hot melt adhesives are well known by those skilled in the art.

It will be appreciated by a skilled person that the composition is present on the exterior surface (side(s)) of the printed paper-based substrate(s) and thus the printed corrugated paper-based substrate, such that variable information production and image(s) formation can be achieved on the printed corrugated paper-based substrate.

Typically, during the manufacture of the printed corrugated paper-based substrates, the composition of the present invention on the printed paper-based substrate is exposed to high temperature conditions during bonding of the printed paper-based substrate(s) to the corrugated (fluted) paper-based medium. Typically, the composition is exposed to temperatures in the region of 80 to 200° C., such as from 100 to 200° C., or from 120 to 160° C. The compositions of the present invention thus demonstrate heat resistance and do not prematurely colour through interaction between the leuco dye and 1,1,1-tris(4-hydroxyphenyl)ethane during the manufacture of the printed corrugated paper-based substrates, such that the composition remains colourless upon the printed corrugated paper-based substrate prior to the intended application of radiation to effect formation of colour through formation of an image on the substrate. In the context of the twenty-eighth aspect of the present invention, the ability of the composition to not prematurely colour following application to the substrate and exposure to such humidity conditions during bonding of the printed paper-based substrate in the formation of a printed corrugated paper-based substrate prior to the application of radiation can be demonstrated through measurement of a ΔE value which represents any measurable difference in L*a*b* colour of the composition. The difference in L*a*b* colour of a composition applied to a substrate and not subjected to the bonding and manufacturing process, and prior to the application of radiation, and a composition applied to a substrate and subjected to the bonding and manufacturing process into a printed corrugated paper-based substrate (including temperatures of from 80 to 200° C.), but prior to the application of radiation, can be compared to determine a ΔE value. A low ΔE measurement is preferred, indicating that there is little quantitative colour difference between the two samples being compared such that they can be considered qualitatively comparable and visually the same, i.e. no premature colouration has occurred. Typically, ΔE is measured using a spectrophotometer such as an X-rite Exact Spectrophotometer. It will be appreciated that measurement of ΔE will be effected by the overall conditions, including high-temperature, to which the composition is subjected. In the context of present invention, when measured under the lab-based conditions shown for Examples 2 and 3, a ΔE of 10 or less at 160° C. is preferred, such as a ΔE of 6 or less, or even a ΔE of 5 or less, such as a ΔE or 2 or less. In addition, the composition may also be exposed to high-humidity conditions, i.e. a relative humidity of at least 50% or specific humidity of from 0.1 to 100 g/kg, during the bonding process. The compositions of the present invention thus also demonstrate humidity-resistance and do not prematurely colour through interaction between the leuco dye and 1,1,1-tris(4-hydroxyphenyl)ethane during the manufacture of the printed corrugated paper-based substrates, such that the composition remains colourless upon the printed corrugated paper-based substrate prior to intended application of radiation to effect formation of an image. In the context of the twenty-eighth aspect of the present invention, 'humidity-resistant' thus refers to a composition that does not prematurely colour upon exposure to conditions of at least 50% relative humidity or conditions of from 0.1 to 100 g/kg specific humidity during manufacture of the printed corrugated paper-based substrate. The printed paper-based substrate may be exposed to conditions of at least 50% relative humidity, such as at least 60% relative humidity, or at least 70% relative humidity, such as at least 80% relative humidity, or even at least 90% relative humidity. The upper limit for these relative humidity values is 100% relative humidity. The printed paper-based substrate may be exposed to conditions of from 50 to 100% relative humidity, such as from 50 to 90% relative humidity, including from 50 to 70% relative humidity such as from 50 to 60% relative humidity and from 70 to 100% relative humidity such as from 70 to 90% relative humidity. Measurement of relative humidity values and associated temperature and pressures are as detailed above in relation to all other aspects of the present invention. The printed paper-based substrate may be exposed conditions of from 0.1 to 100 g/kg specific humidity, such as from 1 to 80 g/kg, or from 2 to 75 g/kg, or from 4 to 60 g/kg, or even from 8 to 50 g/kg. Measurement of specific humidity values are as detailed above in relation to all other aspects of the present invention. In the context of the thirtieth aspect of the present invention, the ability of the composition to not prematurely colour following application to the substrate and exposure to such humidity conditions during bonding of the printed paper-based substrate in the formation of a printed corrugated paper-based substrate prior to the application of radiation can also be demonstrated through measurement of a ΔE value which represents any measurable difference in L*a*b* colour of the composition. The difference in L*a*b* colour of a composition applied to a substrate and not subjected to the bonding and manufacturing process, and prior to the application of radiation, and a composition applied to a substrate and subjected to the bonding and manufacturing process into a printed corrugated paper-based substrate (including conditions of at least 50% relative humidity or conditions of from 0.1 to 100 g/kg specific humidity), but prior to the application of radiation, can be compared to determine a ΔE value. A low ΔE measurement is preferred, indicating that there is little quantitative colour difference between the two samples being compared such that they can be considered qualitatively comparable and visually the same, i.e. no premature colouration has occurred. Typically, ΔE is measured using a spectrophotometer.

As for all other aspects of the present invention, the water-based compositions applied to the printed paper-substrate of the thirtieth aspect of the present invention is colourless such that it is colourless upon application to the substrate and prior to application of any radiation thereto to cause formation of colour and generation of an image. Specifically, for the thirtieth aspect of the present invention, the composition will remain colourless following formation of the printed corrugated paper-based substrate, such that the printed corrugated paper-based substrate formed comprising a colourless composition applied thereto prior to any application of radiation to form the desired image(s).

During the bonding of the printed paper-based substrates to the corrugated paper-based medium, the composition on the paper or card substrates will also typically be exposed to frictional forces and pressures, and travel through the apparatus at speeds of 20 to 500 metres per minute, such as 300 metres per minute.

Preferably, the printed corrugated paper or card substrate comprises a corrugated (fluted) paperboard medium inner having two outer paper liners bonded thereto.

The application of the composition to a substrate enables an image(s) to be formed thereon.

According to a thirty-first aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate.

According to a thirty-second aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate, the image capable of being retained on the substrate for at least 1 day under conditions of at least 50% relative humidity.

According to a thirty-third aspect of the present invention, there is provided a method of forming an image on a substrate having a composition applied thereto, the composition comprising a leuco dye and 1,1,1-tris(4-hydroxyphenyl)ethane, and wherein the method comprises exposing the composition to NIR or IR radiation to form an image on the substrate, the image capable of being retained on the substrate for at least 1 day under conditions of from 0.1 to 100 g/kg specific humidity.

According to a thirty-fourth aspect of the present invention, there is provided a method of forming an image on a substrate having a composition applied thereto, the composition comprising a leuco dye, 1,1,1-tris(4-hydroxyphenyl) ethane and an organic non-polar solvent, and wherein the method comprises exposing the composition to radiation to form an image on the substrate.

According to a thirty-fifth aspect of the present invention, there is provided a method of forming an image on a substrate having a composition applied thereto, the composition comprising a leuco dye, 1,1,1-tris(4-hydroxyphenyl) ethane and an organic non-polar solvent, and wherein the method comprises exposing the composition to radiation to form an image on the substrate, the image capable of being retained on the substrate for at least 1 day under conditions of at least 50% relative humidity.

According to a thirty-sixth aspect of the present invention, there is provided a method of forming an image on a substrate having a composition applied thereto, the composition comprising a leuco dye, 1,1,1-tris(4-hydroxyphenyl) ethane and an organic non-polar solvent, and wherein the method comprises exposing the composition to radiation to form an image on the substrate, the image capable of being retained on the substrate for at least 1 day under conditions of from 0.1 to 100 g/kg specific humidity.

All features of the above thirty-first to thirty-sixth aspects, and as discussed below as preferred or optional, are applicable to all other aspects described herein. In the same manner, all features of all other aspects described herein, whether preferred or optional, are applicable to the above thirty-first to thirty-sixth aspects of the present invention.

The radiation may be applied to the composition on the substrate to selectively form colour at localised positions in order to form a desired image. A human and/or machine readable image is formed.

The composition of the present invention is a radiation-reactive composition. The composition of the present invention is a laser-reactive or laser-imageable composition.

It will be appreciated by a skilled person that the radiation selected will be that required to cause the leuco dye to form a discernible colour.

The term "image" incorporates, but is not limited to: logos, marks, graphics, figures, pictures, symbols, codes, linear barcodes, 2-dimensional Datamatrix, QR (quick response) codes, microtext and text including alphanumeric fonts and symbol fonts and characters. It will be appreciated that in the context of the present invention, it is the manipulation of the composition comprising the leuco dye and 1,1,1-tris(4-hydroxyphenyl)ethane that facilitates the formation of an image on the substrate. The image formed will be human and/or machine readable, and can be used for coding and marking, tagging, tracking and tracing and late-stage customisation or personalisation purposes. The density of the image is measured by ODB, ODC, ODM and ODY values as described above. In the context of the present invention, the image will be a contrasting image. By "contrasting image" is meant that the image formed by the composition on the substrate is distinct and easily discernible form the background, i.e. the part(s) of the composition that has been printed (applied to the substrate) but not been exposed to the radiation, or the colour of the substrate where visible through the composition. The composition is colourless. In some instances, the colour of the substrate may be visible through the composition following application to the substrate. Preferably, the image formed has an absolute ODB, ODC, ODM or ODY value of 1.0 or more, such as 1.1 or more, or even 1.2 or more, such as 1.3 or more, or 1.4 or more. Preferably, the image formed is black in colour, or a shade or tint thereof. Accordingly, the image formed preferably has an absolute ODB value of 1.0, such as 1.1 or more, or even 1.2 or more, such as 1.3 or more, or 1.4 or more. Such an absolute ODB, ODC, ODM or ODY value of 1.0 or more provides a contrasting image that is distinct and easily discernible from the background, i.e. the part(s) of the composition that has been printed (applied to the substrate) but not exposed to radiation, or the colour of the substrate where visible through the composition.

"Radiation" and like terms used herein refers to energy in the form of waves or particles, and in particular, refers to electromagnetic radiation such as ultraviolet (UV), visible, near-infrared (NIR) and infrared (IR) including near, mid and far infrared (IR) or microwaves. The wavelength ranges of the different regions of the electromagnetic spectrum are known to a skilled person.

By the term 'laser source(s)' and like terms used herein includes any suitable commercial non-contact laser source (s), such as an NIR fibre laser or $CO_2$ laser which provides IR radiation.

Other than where specifically stated in the aspects of the present invention, the radiation may be selected from ultraviolet (UV) radiation with a wavelength of from 10 to 400 nm, visible radiation with a wavelength of from 400 to 700 nm, infrared (IR) radiation with a wavelength of from 700 nm to 1 mm, including near-infrared (NIR) radiation with a wavelength of from 700 to 1600 nm. Preferably, the radiation is selected from visible radiation with a wavelength of from 400 to 700 nm, infrared (IR) radiation with a wavelength of 9000 to 12000 nm (applied using a $CO_2$ laser), infrared radiation with a wavelength of from 700 nm to 1 mm, and near-infrared (NIR) radiation with a wavelength of 700 to 1600 nm. More preferably, the radiation is selected from infrared (IR) radiation with a wavelength of 9300, 9600, 10200 or 10600 nm (applied using a $CO_2$ laser), infrared radiation with a wavelength of from 700 nm to 1 mm, and near-infrared (NIR) radiation with a wavelength of 700 to 1600 nm. Most preferably, the radiation is infrared (IR) radiation with a wavelength of 10600 nm (applied using a $CO_2$ laser) and near-infrared (NIR) radiation with a wavelength of from 950 to 1100 nm.

When the composition is a water-based composition, the radiation is preferably selected from NIR or IR radiation.

In the context of the present invention, the term 'NIR or IR radiation' refers to radiation selected from infrared (IR) radiation with a wavelength of 9300, 9600, 10200 or 10600 nm (applied using a $CO_2$ laser), infrared (IR) radiation with a wavelength of from 700 nm to 1 mm, and near-infrared (NIR) radiation with a wavelength of 700 to 1600 nm. Preferably, the radiation is infrared (IR) radiation with a wavelength of 10600 nm (applied using a $CO_2$ laser) and near-infrared (NIR) radiation with a wavelength of from 950 to 1100 nm.

When the composition is an organic non-polar solvent-based composition, the radiation may be selected from ultraviolet (UV) radiation with a wavelength of from 10 to 400 nm, visible radiation with a wavelength of from 400 to 700 nm, and infrared (IR) radiation with a wavelength of from 700 nm to 1 mm, including near-infrared (NIR) radiation with a wavelength of from 700 to 1600 nm. Preferably, when the composition is an organic non-polar solvent-based composition, the radiation is selected from visible radiation with a wavelength of from 400 to 700 nm, infrared (IR) radiation with a wavelength of 9000 to 12000 nm (applied using a $CO_2$ laser), infrared radiation with a wavelength of from 700 nm to 1 mm, and near-infrared (NIR) radiation with a wavelength of 700 to 1600 nm. More preferably, when the composition is an organic non-polar solvent-based composition, the radiation is selected from infrared (IR) radiation with a wavelength of 9300, 9600, 10200 or 10600 nm (applied using a $CO_2$ laser), infrared radiation with a wavelength of from 700 nm to 1 mm, and near-infrared (NIR) radiation with a wavelength of 700 to 1600 nm. Most preferably, when the composition is an organic non-polar solvent-based composition, the radiation is infrared (IR) radiation with a wavelength of 10600 nm (applied using a $CO_2$ laser) and near-infrared (NIR) radiation with a wavelength of from 950 to 1100 nm.

The radiation may be applied to the composition by any suitable means. Suitable means include laser excitation through application of radiation to the composition by a suitable laser source(s). For example, an NIR laser, an IR laser, or a $CO_2$ laser which provides IR radiation. It will therefore be appreciated that the compositions are laser-reactive or laser-imageable compositions. It will be understood by a skilled person that the radiation may be applied to the composition at localised positions to selectively facilitate the formation of the image at these localised positions in the composition. These localised positions may overlap with each other. It will also be understood by a skilled person that the radiation is applied to the composition for an appropriate amount of time required to facilitate the formation of image. Typically the time required to deliver sufficient radiation will depend upon the means used to apply radiation and the method of application. For example, in one embodiment, the radiation may be applied to the composition for less than 120 seconds or for less than 60 seconds, such as for less than 20 seconds, or even less than 10 seconds or even less than 5 seconds.

It will be appreciated that when applied using a laser source(s), the radiation dosage applied can be controlled by alteration of the time for which the radiation is applied, the power of the means used to apply the radiation (wattage) and thus, the fluence (amount of energy delivered per unit area) delivered by a laser source(s), e.g. $J/cm^2$. It will be appreciated by a skilled person that this may affect the density of the image formed. For example, where a laser source(s) is used to apply the radiation, the fluence (amount of energy delivered per unit area) may affect the density of the image formed. In the context of the present invention, the fluence is dependent upon the power of the means used to apply the radiation (wattage), and the time for which the radiation is applied to a particular localised position of the composition on the substrate, which may be controlled by the scanning speed of the laser or the speed of the moving printed composition, for example using a linear stage, an XY translation table, a rotary motorised turntable, a conveyor belt or a reel-to-reel handling system. These two variables can be altered to change the fluence. Where the fluence is low (e.g. lower power and/or shorter irradiation times), the image formed will have lower density (lower absolute ODB, ODM, ODC or ODY value), and where the fluence is high (e.g. higher power and/or longer irradiation times), the image formed will have a higher density (higher absolute ODB, ODM, ODC or ODY value) and be of higher contrast with the background of the composition. In the context of the present invention, fluence values may range from 0.01 to 50 $J/cm^2$, such as from 0.1 to 20 $J/cm^2$, and even from 0.5 to 10 $J/cm^2$, such as from 0.5 to 5 $J/cm^2$.

Preferably, the radiation is applied to the composition at localised positions of the composition in order to form a desired image. Essentially, upon application of the radiation, colour is formed at the areas of the composition on the substrate to which the radiation is applied. The leuco dye and 1,1,1-tris(4-hydroxyphenyl) interact to form colour and thus, generate an image(s). A human and/or machine-readable image is thus generated. As discussed in more detail above, the image is capable of being retained on the substrate for at least 1 day under conditions of at least 50% relative humidity or conditions of from 0.1 to 100 g/kg specific humidity. Preferably, the image is retained on the substrate for at least 1 day under conditions of at least 50% relative humidity or conditions of from 0.1 to 100 g/kg specific humidity. The conditions of relative humidity and specific humidity under which the image can be retained are as described herein in relation to all aspects of the present invention. Further, as discussed in more detail above, the image is capable of being retained on the substrate for at least 1 day under conditions of from 80 to 200° C., such as from 100 to 200° C., or even from 120 to 160° C. Preferably, the image is retained on the substrate for at least 1 day under conditions of from 80 to 200° C., such as from 100 to 200° C., or even from 120 to 160° C. The time frame for which the image may be retained on the substrate under such high temperature conditions is as described herein for the conditions of relative humidity or specific humidity in relation to all aspects of the present invention.

According to a thirty-seventh aspect of the present invention, there is provided a use of a composition comprising a leuco dye, 1,1,1-tris(4-hydroxyphenyl)ethane and an organic non-polar solvent, in the formation of an image on a substrate having the composition applied thereto upon exposure of the composition to radiation.

According to a thirty-eighth aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation.

According to a thirty-ninth aspect of the present invention, there is provided a use of a composition comprising a leuco dye, 1,1,1-tris(4-hydroxyphenyl)ethane and an organic non-polar solvent, in the formation of an image on a substrate having the composition applied thereto upon exposure of the composition to radiation, said composition being capable of retaining said image for at least 1 day under conditions of at least 50% relative humidity.

According to a fortieth aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation, said composition being capable of retaining said image for at least 1 day under conditions of at least 50% relative humidity.

According to a forty-first aspect of the present invention, there is provided a use of a composition comprising a leuco dye, 1,1,1-tris(4-hydroxyphenyl)ethane and an organic non-polar solvent, in the formation of an image on a substrate having the compositions applied thereto upon exposure of the composition to radiation, said composition being capable of retaining said image for at least 1 day under conditions of from 0.1 to 100 g/kg specific humidity.

According to a forty-second aspect of the present invention, there is provided a use of a composition comprising a leuco dye and 1,1,1-tris(4-hydroxyphenyl)ethane in the formation of an image on a paper-based substrate having the composition applied thereto upon exposure of the composition to NIR or IR radiation, said composition being capable of retaining said image for at least 1 day under conditions of from 0.1 to 100 g/kg specific humidity.

All features of the above thirty-seventh to forty-second aspects, and as discussed below as preferred or optional, are applicable to all other aspects described herein. In the same manner, all features of all other aspects described herein, whether preferred or optional, are applicable to the above thirty-seventh to forty-second aspects of the present invention.

All references to particular chemical compounds herein are to be interpreted as covering the compounds per se, and also, where appropriate, derivatives, hydrates, solvates, complexes, isomers and tautomers thereof.

All references to "wt %" refer to the weight percentage of the component in terms of the total composition.

All of the features contained herein may be combined with any of the above aspects and in any combination.

For a better understanding of the present invention, and to show how embodiments of the same may be carried into effect, reference will now be made, by way of example, to the following experimental data.

EXAMPLES

Example 1

A water-based composition comprising a leuco dye and 1,1,1-tris(4-hydroxyphenyl)ethane was formulated according to Table 3, using the formulations of Tables 1 and 2. The formulation of Tables 1 and 2 were blended together using a Silverson L5M mixer followed by mechanical particle size reduction processing by recirculation in an Eiger Torrance M50 horizontal bead-mill with 1.5 mm YTZ (Yttria Zirconia) ceramic beads. The milled formulations of Tables 1 and 2 were then blended together using a Silverson L5M mixer and the additional components of the formulation detailed in Table 3 added thereto. All amounts are provided in weight percentage (wt %).

TABLE 1

| Formulation of 1,1,1-tris(4-hydroxyphenyl)ethane | |
|---|---|
| Component | Wt % |
| Joncryl ECP 651 [MEA] solution from BTC Europe (binder) | 40.5 |
| CF54 from Blackburn Chemicals (antifoaming agent) | 1 |
| Water | 23.2 |
| Hydroplast WE 3650 from BTC Europe (wetting agent) | 0.3 |
| 1,1,1-tris(4-hydroxyphenyl)ethane from J&H Chemical | 35 |

TABLE 2

| Formulation of Leuco Dye | |
|---|---|
| Component | Wt % |
| Joncryl ECP 651 [MEA] solution from BTC Europe (binder) | 47 |
| CF54 from Blackburn Chemicals (antifoaming agent) | 1 |
| Water | 17 |
| 2'-Anilino-6'-(dibutylamino)-3'-methyl-3H-spiro[2-benzofuran-1,9'-xanthen]-3-one (CAS No. 89331-94-2) from Connect Chemicals (leuco dye) | 35 |

TABLE 3

| Component | Wt % |
|---|---|
| Formulation of 1,1,1-tris(4-hydroxyphenyl)ethane | 51 |
| Formulation of leuco dye | 26 |
| Ceridust 9610 F from Azelis (wax) | 3 |
| SE 181 from Indulor (binder) | 20 |

Measurement of Humidity-Resistance of the Compositions of Example 1

The composition of Example 1 was applied to four paper liners (white top kraft substrate) by flexographic printing using the Flexiproofer 100 fitted with a 16 volume anilox in accordance with ISO 2834-2 at a dry coating weight of 2.5 gsm. A black coloured image was formed on each substrate through application of IR radiation using a Videojet VJ-3320 SHC-60 $CO_2$ laser at a fluence of 0.5 to 5 $J/cm^2$ to localised positions of the compositions.

The paper liners comprising the composition of Example 1 applied thereto were then each exposed to one of the following sets of conditions for 6 weeks:

A 75.09% relative humidity at 30° C./19.79 g/kg specific humidity

B 74.68% relative humidity at 40° C./34.53 g/kg specific humidity

C 83.62% relative humidity at 30° C./22.07 g/kg specific humidity

D 82.32% relative humidity at 40° C./38.14 g/kg specific humidity

These conditions were selected to control and thus determine the relative humidity (%) at temperature (° C.) and pressure (hPa) in a closed system by use of the corresponding saturated salt aqueous solutions and therefore to also control the specific humidity (g/kg).

To achieve each set of conditions, the substrates were placed in an enclosed chamber with a saturated salt aqueous solution and heated to the stated temperature. For conditions A and B, an NaCl (sodium chloride) saturated salt aqueous solution was utilised. For conditions C and D, a KCl (potassium chloride) saturated salt aqueous solution was utilised. The pressure for each set of conditions was sea level atmospheric pressure of 1013.25 hPa. Relative humidity was controlled and thus determined using the saturated salt aqueous solutions and standard literature calculated conversion values. Specific humidity was calculated using equation (1) from the known values of relative humidity (%), temperature (° C.) and pressure (hPa).

The absolute ODB values were measured every week for each sample under each set of conditions as shown in Table 5.

TABLE 5

| Weeks | A | B | C | D |
|---|---|---|---|---|
| | | Absolute ODB Value | | |
| 0 | 1.4 | 1.46 | 1.36 | 1.36 |
| 1 | 1.4 | 1.44 | 1.36 | 1.3 |
| 2 | 1.41 | 1.46 | 1.35 | 1.28 |
| 3 | 1.4 | 1.43 | 1.31 | 1.25 |
| 4 | 1.4 | 1.45 | 1.3 | 1.26 |
| 5 | 1.39 | 1.45 | 1.31 | 1.28 |
| 6 | 1.4 | 1.44 | 1.29 | 1.27 |

The absolute ODB value for the composition of Example 1 is retained above 1.2, i.e. 1.0 or more, under each of conditions A, B, C and D. The formation of a humidity-resistant image using the composition of the present invention is thus clearly demonstrated. The presence of 1,1,1-tris(4-hydroxyphenyl)ethane enables the formation of a humidity-resistant composition.

Example 2

A water-based composition comprising a leuco dye and 1,1,1-tris(4-hydroxyphenyl)ethane was formulated according to Example 1 above.

Comparative Examples 1 to 5

Comparative compositions 1 to 5 comprising a leuco dye and a colour developer were formulated according to Example 1 above, but the 1,1,1-tris(4-hydroxyphenyl)ethane was replaced by different colour developers as shown in Table 6.

TABLE 6

| | Colour Developer |
|---|---|
| Comparative Example 1 | Bis(4-hydroxyphenyl)sulphone |
| Comparative Example 2 | Butyl-4-hydroxybenzoate |
| Comparative Example 3 | Octadecyl gallate |
| Comparative Example 4 | Pergafast 201 |
| Comparative Example 5 | Nipabenzyl BHB |

Measurement of Humidity-Resistance of the Compositions of Example 2 and Comparative Examples 1 to 5

The compositions of Example 2 and each of Comparative Examples 1 to 5 were each applied to paper liners (white top kraft substrate) by flexographic printing using the Flexi-proofer 100 fitted with a 16 volume anilox in accordance with ISO 2834-2 at a dry coating weight of 2.5 gsm. A black coloured image was formed on each substrate through application of IR radiation using a Videojet VJ-3320 SHC-60 $CO_2$ laser at a fluence of 0.5 to 5 $J/cm^2$ to localised positions of the compositions.

Each of the paper liners was then exposed to the following conditions for 21 days:

E 82.32% relative humidity at 40° C./38.14 g/kg specific humidity

To achieve the conditions E, the substrates were placed in an enclosed chamber with a saturated KCl (potassium chloride) salt aqueous solution and heated to the stated temperature. The pressure for each set of conditions was sea level atmospheric pressure of 1013.25 hPa. Relative humidity was controlled and thus determined using the saturated salt aqueous solutions and standard literature calculated conversion values. Specific humidity was calculated using equation (1) from the known values of relative humidity (%), temperature (° C.) and pressure (hPa).

The absolute ODB values were measured at 0, 4, 7, 14 and 21 days for each sample as shown in Table 7.

TABLE 7

| | Absolute ODB Value | | | | |
|---|---|---|---|---|---|
| | 0 days | 4 days | 7 days | 14 days | 21 days |
| Example 2 | 1.44 | 1.44 | 1.44 | 1.42 | 1.40 |
| Comparative Example 1 | 1.11 | 1.07 | 0.85 | 0.7 | 0.61 |
| Comparative Example 2 | 1.77 | 0.44 | 0.13 | 0.12 | 0.11 |
| Comparative Example 3 | 1.13 | 0.63 | 0.57 | 0.38 | 0.35 |
| Comparative Example 4 | 1.26 | 1.22 | 0.96 | 0.87 | 0.85 |
| Comparative Example 5 | 1.59 | 1.50 | 0.67 | 0.38 | 0.3 |

The absolute ODB value for the composition of Example 2 is retained above 1.4, i.e. is 1.0 or more, under condition E over 21 days. The same cannot be said for the compositions of Comparative Examples 1 to 5—the ODB value decreases below 1.0 over time. The formation of a humidity-resistant image using the composition of the present invention is thus clearly demonstrated. The presence of 1,1,1-tris (4-hydroxyphenyl)ethane enables the formation of a humidity-resistant composition.

Measurement of Heat-Resistance of the Compositions of Example 2 and Comparative Examples 1 to 5

The compositions of Example 2 and each of Comparative Examples 1 to 5 were each applied to paper liners (white top kraft substrate) by flexographic printing using the Flexiproofer 100 fitted with a 16 volume anilox in accordance with ISO 2834-2 at a dry coating weight of 2.5 gsm.

ΔE values were then measured at different high-temperature conditions as shown in Table 8 below. The ΔE values represent the measurable difference in L*a*b* colour of the compositions of Example 2 and each of Comparative Examples 1 to 5 on paper liners that are subjected to high-temperature conditions but prior to the application of radiation, and the L*a*b* colour of the same compositions on paper liners that are not subjected to high-temperature conditions and prior to the application of radiation. ΔE values were measured, under the following lab-based conditions, using an X-rite Exact photospectrometer. Lab-based conditions: A RDM HSM-4 heat sealer with pneumatic mechanical action from compressed air was used to provide the high-temperature conditions at temperatures of 100° C., 120° C., 140° C., 160° C. and 180° C., a dwell time of 0.3 seconds and a pressure of 20 psi. The present inventors consider such conditions to replicate those of a commercial corrugating apparatus during bonding of the printed paper-based substrate in the manufacture of printed corrugated paper-based substrates.

The results are tabulated in Table 8:

TABLE 8

| | ΔE | | | | |
|---|---|---|---|---|---|
| | 100° C. | 120° C. | 140° C. | 160° C. | 180° C. |
| Example 2 | 0.51 | 0.84 | 2.86 | 5.32 | 18.33 |
| Comparative Example 1 | 1.25 | 5.33 | 16.94 | 33.36 | 37.81 |
| Comparative Example 2 | 32.63 | 36.21 | 43.70 | 49.67 | 53.90 |
| Comparative Example 3 | 8.30 | 27.54 | 34.69 | 43.45 | 46.92 |
| Comparative Example 4 | 0.46 | 1.46 | 16.54 | 43.68 | 49.13 |
| Comparative Example 5 | 22.1 | 49.14 | 55.69 | 60.13 | 59.81 |

The ΔE values for the composition of Example 2 are low. The ΔE value for the composition of Example 2 is 10 or less at 160° C., in fact the ΔE value is 6 or less at 160° C. The same cannot be said for the compositions of Comparative Examples 1 to 5 which demonstrate very high ΔE values showing a significant difference between the visual appearance of the compositions of the paper liners that were subjected to high-temperature conditions and those that weren't. The compositions of Comparative Examples 1 to 5 have thus prematurely formed colour and are not suitable for subsequent variable information generation and the formation of an image. The formation of a heat-resistant composition using the composition of the present invention is thus demonstrated. The presence of 1,1,1-(4-hydroxyphenyl)ethane enables the formation of a heat-resistant composition.

Example 2 and Comparative Examples 1 to 5 thus clearly demonstrate the advantageous properties of the composition of the present invention with respect to both humidity- and heat-resistance.

Example 3

A water-based composition comprising a leuco dye and 1,1,1-tris(4-hydroxyphenyl)ethane was formulated according to Example 1 above, except the leuco dye was 2-Anilino-6'-[ethyl(p-toyl)amino]-3'-methylspiro[isobenzofuran-1 (3H),9'-[9H]xanthene]-3-one (CAS No. 59129-79-2).

Comparative Examples 6 to 10

Comparative compositions 6 to 10 comprising a leuco dye and a colour developer were formulated according to Example 1 above, but the leuco dye was 2-Anilino-6'-[ethyl (p-toyl)amino]-3'-methylspiro[isobenzofuran-1 (3H),9'-[9H]xanthene]-3-one (CAS No. 59129-79-2), and the 1,1,1-tris(4-hydroxyphenyl)ethane was replaced by different colour developers as shown in Table 9.

TABLE 9

| | Colour Developer |
|---|---|
| Comparative Example 6 | Bis(4-hydroxyphenyl)sulphone |
| Comparative Example 7 | Butyl-4-hydroxybenzoate |
| Comparative Example 8 | Octadecyl gallate |
| Comparative Example 9 | Pergafast 201 |
| Comparative Example 10 | Nipabenzyl BHB |

Measurement of Humidity-Resistance of the Compositions of Example 3 and Comparative Examples 6 to 10

The compositions of Example 3 and each of Comparative Examples 6 to 10 were each applied to paper liners (white top kraft substrate) by flexographic printing using the Flexi-proofer 100 fitted with a 16 volume anilox in accordance with ISO 2834-2 at a dry coating weight of 2.5 gsm. A black coloured image was formed on each substrate through application of IR radiation using a Videojet VJ-3320 SHC-60 $CO_2$ laser at a fluence of 0.5 to 5 J/cm$^2$ to localised positions of the compositions.

Each of the paper liners was then exposed to the following conditions for 21 days:

E 82.32% relative humidity at 40° C./38.14 g/kg specific humidity

To achieve the conditions E, the substrates were placed in an enclosed chamber with a saturated KCl (potassium chloride) salt aqueous solution and heated to the stated temperature. The pressure for each set of conditions was sea level atmospheric pressure of 1013.25 hPa. Relative humidity was controlled and thus determined using the saturated salt aqueous solutions and standard literature calculated conversion values. Specific humidity was calculated using equation (1) from the known values of relative humidity (%), temperature (° C.) and pressure (hPa).

The absolute ODB values were measured at 0, 4, 7, 14 and 21 days for each sample as shown in Table 10.

TABLE 10

| | Absolute ODB Value | | | | |
|---|---|---|---|---|---|
| | 0 days | 4 days | 7 days | 14 days | 21 days |
| Example 3 | 1.2 | 1.2 | 1.2 | 1.2 | 1.19 |
| Comparative Example 6 | 1.23 | 1.11 | 0.85 | 0.70 | 0.57 |
| Comparative Example 7 | 1.12 | 0.11 | 0.11 | 0.11 | 0.11 |
| Comparative Example 8 | 0.84 | 0.24 | 0.31 | 0.27 | 0.26 |
| Comparative Example 9 | 1.14 | 1.0 | 0.61 | 0.55 | 0.53 |
| Comparative Example 10 | 1.43 | 0.2 | 0.14 | 0.13 | 0.13 |

The absolute ODB value for the composition of Example 3 is retained above 1.15, i.e. is 1.0 or more, under condition E over 21 days. The same cannot be said for the compositions of Comparative Examples 6 to 10—either an absolute initial ODB value of 1.0 cannot be reached or the ODB value decreases below 1.0 over time. The formation of a humidity-resistant image using the composition of the present invention is thus clearly demonstrated. The presence of 1,1,1-tris(4-hydroxyphenyl)ethane enables the formation of a humidity-resistant composition.

Measurement of Heat-Resistance of the Compositions of Example 3 and Comparative Examples 6 to 10

The compositions of Example 3 and each of Comparative Examples 6 to 10 were each applied to paper liners (white top kraft substrate) by flexographic printing using the Flexi-proofer 100 fitted with a 16 volume anilox in accordance with ISO 2834-2 at a dry coating weight of 2.5 gsm.

ΔE values were then measured at different high-temperature conditions as shown in Table 11 below. The ΔE values represent the measurable difference in L*a*b* colour of the compositions of Example 3 and each of Comparative Examples 6 to 10 on paper liners that are subjected to high-temperature conditions but prior to the application of radiation, and the L*a*b* colour of the same compositions on paper liners but not subjected to high-temperature conditions and prior to the application of radiation. ΔE values were measured, under the following lab-based conditions, using a X-rite Exact photospectrometer. Lab-based conditions: A RDM HSM-4 heat sealer with pneumatic mechanical action from compressed air was used to provide the high-temperature conditions at temperatures of 100° C., 120° C., 140° C., 160° C. and 180° C. at a dwell time of 0.3 seconds and a pressure of 20 psi. The present inventors consider these conditions to replicate the conditions of a commercial corrugating apparatus during bonding of the printed paper-based substrate in the manufacture of printed corrugated paper-based substrates.

The results are tabulated in Table 11:

TABLE 11

| | ΔE | | | | |
|---|---|---|---|---|---|
| | 100° C. | 120° C. | 140° C. | 160° C. | 180° C. |
| Example 3 | 0.35 | 0.35 | 0.73 | 2.29 | 10.03 |
| Comparative Example 6 | 0.86 | 2.54 | 6.59 | 22.14 | 23.58 |
| Comparative Example 7 | 11.20 | 19.15 | 25.57 | 40.37 | 49.23 |
| Comparative Example 8 | 1.98 | 10.34 | 15.84 | 18.58 | 22.03 |
| Comparative Example 9 | 0.77 | 3.88 | 11.77 | 18.82 | 41.36 |
| Comparative Example 10 | 5.57 | 42.97 | 47.68 | 55.45 | 53.74 |

The ΔE values for the composition of Example 3 are low. The ΔE value for the composition of Example 3 is 10 or less at 160° C., in fact the ΔE value is 5 or less at 160° C. The same cannot be said for the compositions of Comparative Examples 6 to 10, which demonstrate very high ΔE values showing a significant difference between the visual appearance of the compositions of the paper liners that were subjected to high-temperature conditions and those that weren't. The compositions of Comparative Examples 6 to 10 have thus prematurely formed colour and are not suitable for subsequent variable information generation and the formation of an image. The formation of a heat-resistant composition using the composition of the present invention is thus demonstrated. The presence of 1,1,1-(4-hydroxyphenyl)ethane enables the formation of a heat-resistant composition.

Example 3 and Comparative Examples 6 to 10 thus clearly demonstrate the advantageous properties of the composition of the present invention with respect to both humidity- and heat-resistance.

Example 4

An organic non-polar solvent-based composition comprising 1,1,1-tris(4-hydroxyphenyl)ethane and a leuco dye was formulated according to Table 14, using the formulations of Tables 12 and 13. The formulation of Tables 12 and 13 were blended together using a Silverson L5M mixer following separate mechanical particle size reduction processing by recirculation in an Eiger Torrance M50 horizontal bead-mill with 1.5 mm YTZ (Yttria Zirconia) ceramic beads. The milled formulations of Tables 12 and 13 were then blended together using a Silverson L5M mixer. All amounts are provided in weight percentage (wt %).

TABLE 12

Formulation of 1,1,1-tris(4-hydroxyphenyl)ethane

| Component | Wt % |
|---|---|
| Elvacite 2013 from Tennants Distribution Ltd. (binder) | 8.5 |
| Xylene from Brenntag (organic non-polar solvent) | 60.7 |
| Toluene from Brenntag (organic non-polar solvent) | 1.0 |
| VARIPRINT 001 from DataLase (NIR absorber) | 1.1 |
| Zirconium Oxide from Zircomet (pigment) | 2.7 |
| 1,1,1-tris(4-hydroxyphenyl)ethane (THPE) from J&H Chemical | 26 |

TABLE 13

Formulation of Leuco Dye

| Component | Wt % |
|---|---|
| Elvacite 2013 from Tennants Distribution Ltd. (binder) | 8.5 |
| Xylene from Brenntag (organic non-polar solvent) | 59.5 |
| Toluene from Brenntag (organic non-polar solvent) | 1.0 |
| Tinuvin 326 from BTC Europe (UV absorber) | 5.0 |
| 2'-Anilino-6'-(dibutylamino)-3'-methyl-3H-spiro[2-benzofuran-1,9'-xanthen]-3-one (CAS No. 89331-94-2) from Connect Chemicals (leuco dye) | 26.0 |

TABLE 14

| Component | Wt % |
|---|---|
| Formulation of 1,1,1-tris(4-hydroxyphenyl)ethane | 75 |
| Formulation of leuco dye | 25 |

Example 5

An organic non-polar solvent-based composition comprising a leuco dye and 1,1,1-tris(4-hydroxyphenyl)ethane was formulated according to Example 4 above, but replacing 2'-Anilino-6'-(dibutylamino)-3'-methyl-3H-spiro[2-benzofuran-1,9'-xanthen]-3-one (CAS No. 89331-94-2) from Connect Chemicals with 2-Anilino-6'-[ethyl(p-toyl)amino]-3'-methylspiro[isobenzofuran-1(3H),9'-[9H]xanthene]-3-one (CAS No. 59129-79-2) from Connect Chemicals.

Example 6

An organic non-polar solvent-based composition comprising 1,1,1-tris(4-hydroxyphenyl)ethane and a leuco dye was formulated according to Table 17, using the formulations of Tables 15 and 16. The formulation of Tables 15 and 16 were blended together using a Silverson L5M mixer following separate mechanical particle size reduction processing by recirculation in an Eiger Torrance M50 horizontal bead-mill with 1.5 mm YTZ (Yttria Zirconia) ceramic beads. The milled formulations of Tables 15 and 16 were then blended together using a Silverson L5M mixer. All amounts are provided in weight percentage (wt %).

TABLE 15

Formulation of 1,1,1-tris(4-hydroxyphenyl)ethane

| Component | Wt % |
|---|---|
| Elvacite 2013 from Tennants Distribution Ltd. (binder) | 8.5 |
| Xylene from Brenntag (organic non-polar solvent) | 64.5 |
| Toluene from Brenntag (organic non-polar solvent) | 1.0 |
| 1,1,1-tris(4-hydroxyphenyl)ethane (THPE) from J&H Chemical | 26.0 |

TABLE 16

Formulation of Leuco Dye

| Component | Wt % |
|---|---|
| Elvacite 2013 from Tennants Distribution Ltd. (binder) | 8.5 |
| Xylene from Brenntag (solvent) | 64.5 |
| Toluene from Brenntag (solvent) | 1.0 |
| 2-Anilino-6'-[ethyl(p-toyl)amino]-3'-methylspiro[isobenzofuran-1(3H), 9'-[9H]xanthene]-3-one (CAS No. 59129-79-2) from Connect Chemicals (leuco dye) | 26.0 |

TABLE 17

| Component | Wt % |
|---|---|
| Formulation of 1,1,1-tris(4-hydroxyphenyl)ethane | 75 |
| Formulation of leuco dye | 25 |

Example 7

An organic non-polar solvent-based composition comprising a leuco dye and 1,1,1-tris(4-hydroxyphenyl)ethane was formulated according to Example 6 above, but replacing 2'-Anilino-6'-(dibutylamino)-3'-methyl-3H-spiro[2-benzofuran-1,9'-xanthen]-3-one (CAS No. 89331-94-2) from Connect Chemicals with 2-Anilino-6'-[ethyl(p-toyl)amino]-3'-methylspiro[isobenzofuran-1(3H),9'-[9H]xanthene]-3-one (CAS No. 59129-79-2) from Connect Chemicals.

Observations

The compositions of Examples 4 to 7 were each applied to white 30 $\mu$m oriented polypropylene film by Meyer Bar Application using the RK K202 Control Coater fitted with a K3 Meyer Bar at a dry coating weight of 5.5 gsm. For the substrates to which the compositions of Examples 6 and 7 were applied, a black coloured image was formed on each substrate through application of IR radiation using a Videojet VJ-3320 SHC-60 $CO_2$ laser at a fluence of 0.5 to 5 $J/cm^2$ to localised positions of the compositions. For the substrates to which the compositions of Examples 4 and 5 were applied, a black colour image was formed on each substrate through application of NIR radiation using the DataLase FL20 Fibre laser at a fluence of 0.5 to 5 $J/cm^2$ to localised positions of the compositions.

The presence of 1,1,1-tris(4-hydroxyphenyl)ethane thus enables the formulation and use of compositions comprising organic solvents in the formation of an image(s) on a substrate. Further, the use of organic non-polar solvents thus enables the formulation and use of compositions comprising organic solvents in the formation of an image(s) on a substrate.

The compositions of Examples 4 to 7 demonstrate similar advantageous properties with respect to humidity- and heat-resistance as the compositions of Examples 1 to 3.

Example 8

A water-based composition comprising 1,1,1-tris(4-hydroxyphenyl)ethane and a leuco dye was formulated according to Table 21, using the formulations of Tables 18, 19 and 20. The formulations of Tables 18, 19 and 20 were blended together using a Silverson L5M mixer following separate mechanical particle size reduction processing by recirculation in an Eiger Torrance M50 horizontal bead-mill with 1.5 mm YTZ (Yttria Zirconia) ceramic beads. The milled formulations of Tables 18, 19 and 20 were then blended together using a Silverson L5M mixer and any additional components of the formulation detailed in Table 21 added thereto. All amounts are provided in weight percentage (wt %).

TABLE 18

Formulation of 1,1,1-tris(4-hydroxyphenyl)ethane

| Component | Wt % |
|---|---|
| INDUNAL S2230 HPL from Indulor (binder) | 19.1 |
| DISPELAIR CF54 from Blackburn Chemicals (defoamer) | 1.0 |
| WATER | 42.8 |
| DISPERBYK 193 from BYK (dispersant agent) | 2.1 |
| 1,1,1-tris(4-hydroxyphenyl)ethane (THPE) from J&H Chemical | 35.0 |

TABLE 19

Formulation of Leuco Dye

| Component | Wt % |
|---|---|
| INDUNAL S2230 HPL from Indulor (binder) | 49.0 |
| DISPELAIR CF54 from Blackburn Chemicals (defoamer) | 1.0 |
| WATER | 15.0 |
| 2-Anilino-6'-[ethyl(p-toyl)amino]-3'-methylspiro[isobenzofuran-1(3H), 9'-[9H]xanthene]-3-one (CAS No. 59129-79-2) from Connect Chemicals (leuco dye) | 35.0 |

TABLE 20

Formulation of NIR Absorber

| Component | Wt % |
|---|---|
| INDUNAL S2230 HPL from Indulor (binder) | 67.0 |
| DISPELAIR CF54 from Blackburn Chemicals (defoamer) | 1.0 |
| WATER | 7.0 |
| VARIPRINT 001 from DataLase (NIR absorber) | 25.0 |

TABLE 21

| Component | Wt % |
|---|---|
| Formulation of 1,1,1-tris(4-hydroxyphenyl)ethane | 51.9 |
| Formulation of leuco dye | 17.5 |
| Formulation of NIR absorber | 6.5 |
| JONCRYL 8052 from BASF (binder) | 8.1 |
| WATER | 16.0 |

Example 9

A water-based composition comprising a leuco dye and 1,1,1-tris(4-hydroxyphenyl)ethane was formulated according to Example 8 above, but replacing 2-Anilino-6'-[ethyl (p-toyl)amino]-3'-methylspiro[isobenzofuran-1(3H),9'-[9H] xanthene]-3-one (CAS No. 59129-79-2) from Connect Chemicals with 2'-Anilino-6'-(dibutylamino)-3'-methyl-3H-spiro[2-benzofuran-1,9'-xanthen]-3-one (CAS No. 89331-94-2) from Connect Chemicals.

Observations

The compositions of Examples 8 and 9 were each applied to white 30 μm oriented polypropylene film by Meyer Bar Application using the RK K202 Control Coater fitted with a K3 Meyer Bar at a dry coating weight of 5.5 gsm. A black coloured image was formed on each orientated polypropylene film substrate through application of NIR radiation using the DataLase FL20 Fibre laser at a fluence of 0.5 to 5 J/cm$^2$ to localised positions of the compositions.

The compositions of Examples 8 and 9 demonstrate similar advantageous properties with respect to humidity- and heat-resistance as the compositions of Examples 1 to 3.

The invention claimed is:

1. A process for manufacturing packaging from a printed substrate comprising printing a composition to a substrate to form a printed substrate, wherein the composition comprises a leuco dye and 1,1,1-tris(4-hydroxyphenyl) ethane, and subsequently forming the printed substrate into packaging during which the printed substrate, and thus the composition, is exposed to conditions of from 19.79 to 50 g/kg specific humidity, wherein the composition on the resulting packaging does not display colour.

2. The process according to claim 1, wherein the leuco dye is selected from 2'-Anilino-6'-(dibutylamino)-3'-methyl-3H-spiro[2-benzofuran-1,9'-xanthen]-3-one (CAS No. 89331-94-2), 6'-(Diethylamino)-3'-methyl-2'-(phenylamino) spiro[2-benzofuran-3,9'-xanthene]-1-one (CAS No. 29512-49-0), 2-Anilino-6'-[ethyl(p-toyl)amino]-3'-methylspiro [isobenzofuran-1 (3H),9'-[9H]xanthene]-3-one (CAS No. 59129-79-2), (dimethylamino)-3,3-bis-[4-(dimethylamino) phenyl) phthalide (CAS No 1522-42-7), 4,4'-[(9-butyl-9H-carbazol-3-yl)methylene]bis[N-methyl-N-phenylaniline] (CAS No 67707-04-4), 3,3'-Bis(1-n-octyl-2-methylindol-3-yl)phthalide (CAS No 50292-95-0), 6'-(Diethylamino)-3-oxo-spiro[isobenzofuran-1(3H),9'-[9H]xanthene]-2'-car-boxylic acid ethyl ester (CAS No 154306-60-2), 7-[4-(diethylamino)-2-ethoxyphenyl]-7-(2-methyl-1-octyl-1H-indol-3-yl) Furo[3,4-b]pyridin-5(7H)-one (CAS No 87563-89-1), 2'-(Dibenzylamino)-6'-(diethylamino)fluoran (CAS No 34372-72-0), N,N-dimethyl-4-[2-[2-(octyloxy)phenyl]-6-phenyl-4-pyridinyl]-Benzenamine (CAS No 144190-25-0), 6'-(diethylamino)-2'-[(dimethylphenyl)amino]-3'-meth-ylspiro[isobenzofuran-1(3H),9'-[9H]xanthene]-3-one (CAS No 36431-22-8), 4-(N,N-diethylamino)-2-hydroxy-2'-car-boxybenzophenone (CAS No 5809-23-4), and 4-(N,N-dibutylamino)-2-hydroxy-2'-carboxybenzophenone (CAS No 54574-82-2).

3. The process according to claim 1, wherein, during the forming of the printed substrate into packaging, the printed substrate, and thus the composition, is exposed to conditions of from 19.79 to 38.14 g/kg specific humidity.

* * * * *